United States Patent
Kawai

(10) Patent No.: US 12,162,070 B2
(45) Date of Patent: Dec. 10, 2024

(54) PROCESSING SYSTEM, PROCESSING METHOD, COMPUTER PROGRAM, RECORDING MEDIUM, AND CONTROL APPARATUS

(71) Applicant: NIKON CORPORATION, Tokyo (JP)

(72) Inventor: Hidemi Kawai, Chiba (JP)

(73) Assignee: NIKON CORPORATION, Tokyo (JP)

( * ) Notice: Subject to any disclaimer, the term of this patent is extended or adjusted under 35 U.S.C. 154(b) by 963 days.

(21) Appl. No.: 16/964,909

(22) PCT Filed: Jan. 29, 2019

(86) PCT No.: PCT/JP2019/002952
§ 371 (c)(1),
(2) Date: Sep. 4, 2020

(87) PCT Pub. No.: WO2019/151239
PCT Pub. Date: Aug. 8, 2019

(65) Prior Publication Data
US 2021/0001403 A1      Jan. 7, 2021

(30) Foreign Application Priority Data
Jan. 31, 2018   (WO) .................. PCT/JP2018/003190

(51) Int. Cl.
*B22F 10/25*      (2021.01)
*B22F 10/00*      (2021.01)
(Continued)

(52) U.S. Cl.
CPC .............. *B22F 10/25* (2021.01); *B22F 10/00* (2021.01); *B22F 10/31* (2021.01); *B22F 12/90* (2021.01);
(Continued)

(58) Field of Classification Search
CPC .......... B22F 10/25; B22F 10/00; B22F 10/31; B22F 12/90; B22F 10/14; B22F 10/28;
(Continued)

(56) References Cited

U.S. PATENT DOCUMENTS 6,259,962 B1   7/2001   Gothait
6,483,596 B1   11/2002  Philippi et al.
(Continued)

FOREIGN PATENT DOCUMENTS

CN   107000059 A   8/2017
EP   1 752 240 A1  2/2007
(Continued)

OTHER PUBLICATIONS

Mar. 28, 2023 Office Action issued in Japanese Patent Application No. 2022-031502.
(Continued)

*Primary Examiner* — Adil A. Siddiqui
(74) *Attorney, Agent, or Firm* — Oliff PLC

(57) ABSTRACT

A processing system is provided with: a support apparatus that is configured to support a processing target; a processing apparatus that performs an additive processing by irradiating a processed area on the processing target with an energy beam and by supplying materials to an area that is irradiated with the energy beam; and a position change apparatus that changes a positional relationship between the support apparatus and an irradiation area of the energy beam from the processing apparatus, wherein the processing system forms a fiducial build object by performing the additive processing on at least one of a first area that is a part of the support apparatus and a second area that is a part of the processing target, and the processing system controls at least one of the processing apparatus and the position change apparatus by using an information relating to the fiducial build object.

56 Claims, 15 Drawing Sheets

(51) Int. Cl.
*B22F 10/14* (2021.01)
*B22F 10/28* (2021.01)
*B22F 10/31* (2021.01)
*B22F 10/32* (2021.01)
*B22F 12/45* (2021.01)
*B22F 12/90* (2021.01)
*B29C 64/153* (2017.01)
*B29C 64/393* (2017.01)
*B33Y 30/00* (2015.01)
*B33Y 50/02* (2015.01)

(52) U.S. Cl.
CPC .......... *B29C 64/153* (2017.08); *B29C 64/393* (2017.08); *B33Y 30/00* (2014.12); *B33Y 50/02* (2014.12); *B22F 10/14* (2021.01); *B22F 10/28* (2021.01); *B22F 10/32* (2021.01); *B22F 12/45* (2021.01)

(58) Field of Classification Search
CPC ...... B22F 10/32; B22F 12/45; B22F 2999/00; B29C 64/153; B29C 64/393; B29C 64/268; B33Y 30/00; B33Y 50/02; Y02P 10/25; B23K 26/342
See application file for complete search history.

(56) References Cited

U.S. PATENT DOCUMENTS

| | | | |
|---|---|---|---|
| 9,205,691 | B1 | 12/2015 | Jones et al. |
| 2007/0252309 | A1 | 11/2007 | Higashi et al. |
| 2016/0185047 | A1 | 6/2016 | Windau et al. |
| 2017/0014909 | A1 | 1/2017 | Tanaka et al. |
| 2017/0014950 | A1 | 1/2017 | Okada |
| 2017/0304946 | A1* | 10/2017 | Shibazaki .............. B33Y 50/02 |
| 2018/0036949 | A1 | 2/2018 | Lopez et al. |

FOREIGN PATENT DOCUMENTS

| | | | |
|---|---|---|---|
| JP | 2000-326416 A | 11/2000 | |
| JP | 2002-210835 A | 7/2002 | |
| JP | 2003-535712 A | 12/2003 | |
| JP | 2005-336547 A | 12/2005 | |
| JP | 2008-073782 A | 4/2008 | |
| JP | 2015-196249 A | 11/2015 | |
| JP | 2018-001725 A | 1/2018 | |
| JP | 2018-008307 A | 1/2018 | |
| WO | 2015/141032 A1 | 9/2015 | |
| WO | WO-2016075801 A1 * | 5/2016 | ............. B22F 10/00 |
| WO | 2016/173668 A1 | 11/2016 | |
| WO | 2017/158327 A1 | 9/2017 | |

OTHER PUBLICATIONS

Oct. 12, 2021 Japanese Office Action issued in Japanese Patent Application No. 2019-568469.
Oct. 4, 2022 Office Action Issued in Japanese Patent Application No. 2022-031502.
Apr. 23, 2019 International Search Report issued in International Patent Application No. PCT/JP2019/002952.
Apr. 23, 2019 Written Opinion of the International Searching Authority issued in International Patent Application No. PCT/JP2019/002952. .
Sep. 2, 2021 Search Report issued in European Patent Application No. 19 746 816.8.
Dec. 3, 2021 Office Action issud in Chinese Patent Application No. 201980010940.X.
Aug. 10, 2022 Office Action issued in Chinese Patent Application No. 201980010940.X.
Aug. 15, 2022 Office Action issued in Japanese Patent Application No. 2019-569125.
Dec. 5, 2023 Office Action issued in Japanese Patent Application No. 2023-046355.
Aug. 1, 2023 Office Action issued in Japanese Patent Application No. 2022-193918.
Oct. 5, 2023 Office Action issued in European Patent Application No. 19 746 816.8.
Apr. 2, 2024 Office Action issued in Japanese Patent Application No. 2023-046355.
May 29, 2024 Office Action issued in Chinese Patent Application No. 202310369173.X.

* cited by examiner

PROCESSING SYSTEM, PROCESSING METHOD, COMPUTER PROGRAM, RECORDING MEDIUM, AND CONTROL APPARATUS

TECHNICAL FIELD

The present invention relates to a processing system, a processing method, a computer program, a recording medium and a control apparatus for performing additive processing on a processing target, for example.

BACKGROUND ART

A Patent Literature 1 discloses a processing system that performs additive processing by melting a powdery material with an energy beam and then solidifying the molten material again. A technical problem of the processing system is to perform processing in an appropriate position.

CITATION LIST

Patent Literature

Patent Literature 1: US 2017/0014909A1

SUMMARY OF INVENTION

A first aspect provides a processing system provided with: a support apparatus that is configured to support a processing target; a processing apparatus that performs a processing by irradiating a processed area on the processing target with an energy beam; a position change apparatus that changes a relative positional relationship between the support apparatus and an irradiation area of the energy beam; and a control apparatus that controls the position change apparatus on the basis of a position information of a reference that is formed by performing the processing on at least one of the support apparatus and the processing target by the processing apparatus.

A second aspect provides a processing system provided with: a support apparatus that is configured to support a processing target; a processing apparatus that performs an additive processing by irradiating a processed area on the processing target with an energy beam and by supplying materials to an area that is irradiated with the energy beam; and a position change apparatus that changes a positional relationship between the support apparatus and an irradiation area of the energy beam from the processing apparatus, wherein the processing system forms a fiducial build object by performing the additive processing on at least one of a first area that is a part of the support apparatus and a second area that is a part of the processing target, and the processing system controls at least one of the processing apparatus and the position change apparatus by using an information relating to the fiducial build object.

A third aspect provides a processing method for emitting an energy beam from a processing apparatus and performing an additive processing on a processing target, the processing method including: supporting the processing target by a support apparatus; forming a fiducial build object by performing the additive processing on at least one of a first area that is a part of the support apparatus and a second area that is a part of the processing target; measuring the fiducial build object; and changing a positional relationship between the support apparatus and an irradiation area of the energy beam from the processing apparatus on the basis of an information relating to the measured fiducial build object.

A fourth aspect provides a processing system provided with: a support apparatus that is configured to support a processing target; a processing apparatus that performs an additive processing by irradiating a processed area on the processing target with an energy beam and by supplying materials to an area that is irradiated with the energy beam; a position change apparatus that changes a positional relationship between the support apparatus and an irradiation area of the energy beam from the processing apparatus; and a receiving apparatus that receives a control signal for controlling at least one of the support apparatus, the processing apparatus and the position change apparatus to form a fiducial build object by performing the additive processing on at least one of a first area that is a part of the support apparatus and a second area that is a part of the processing target, and for controlling at least one of the processing apparatus and the position change apparatus by using an information relating to the fiducial build object.

A fifth aspect provides a computer program that is executed by a computer for controlling a build system provided with: a support apparatus that is configured to support a processing target; a processing apparatus that performs an additive processing by irradiating a processed area on the processing target with an energy beam and by supplying materials to an area that is irradiated with the energy beam; and a position change apparatus that changes a positional relationship between the support apparatus and an irradiation area of the energy beam from the processing apparatus, wherein the computer program allows the computer to execute a process for forming a fiducial build object by performing the additive processing on at least one of a first area that is a part of the support apparatus and a second area that is a part of the processing target, and a process for controlling at least one of the processing apparatus and the position change apparatus by using an information relating to the fiducial build object.

A sixth aspect provides a recording medium on which the computer program provided by the fourth aspect as described above is recorded.

A seventh aspect provides a control apparatus that controls a build system provided with: a support apparatus that is configured to support a processing target; a processing apparatus that performs an additive processing by irradiating a processed area on the processing target with an energy beam and by supplying materials to an area that is irradiated with the energy beam; and a position change apparatus that changes a positional relationship between the support apparatus and an irradiation area of the energy beam from the processing apparatus, wherein the control apparatus executes a process for forming a fiducial build object by performing the additive processing on at least one of a first area that is a part of the support apparatus and a second area that is a part of the processing target, and a process for controlling at least one of the processing apparatus and the position change apparatus by using an information relating to the fiducial build object.

An operation and another advantage of the above described aspect will be apparent from an embodiment described below.

DESCRIPTION OF EMBODIMENTS

Next, with reference to drawings, embodiments of a processing system, a processing method, a computer program, a recording medium and a control apparatus will be described. In the below described description, the embodiments of a processing system, a processing method, a computer program, a recording medium and a control apparatus will be described by using a build system 1 that is configured to form a build object by performing an additive processing using build materials M by a LMD (Laser Metal Deposition). Note that the Laser Metal Deposition may be referred to as a Direct Metal Deposition, a Direct Energy Deposition, a Laser Cladding, a Laser Engineered Net Shaping, a Direct Light Fabrication, a Laser Consolidation, a Shape Deposition Manufacturing, a Wire Feed Laser Deposition, a Gas Through Wire, a Laser Powder Fusion, a Laser Metal Forming, a Selective Laser Powder Re-melting, a Laser Direct Casting, a Laser Powder Deposition, a Laser Additive Manufacturing or a Laser Rapid Forming.

Moreover, in the below described description, a positional relationship of various components that constitute the build system 1 will be described by using an XYZ rectangular coordinate system that is defined by a X axis, a Y axis and a Z axis that are perpendicular to one another. Note that each of an X axis direction and a Y axis direction is assumed to be a horizontal direction (namely, a predetermined direction in a horizontal plane) and a Z axis direction is assumed to be a vertical direction (namely, a direction that is perpendicular to the horizontal plane, and substantially an up-down direction or a gravity direction), for the purpose of simple description. Moreover, rotational directions (in other words, inclination directions) around the X axis, the Y axis and the Z axis are referred to as a OX direction, a OY direction and a OZ direction, respectively. Here, the Z axis direction may be the gravity direction. An XY plane may be a horizontal direction.

(1) Entire Structure of Build System 1

Figure 1:
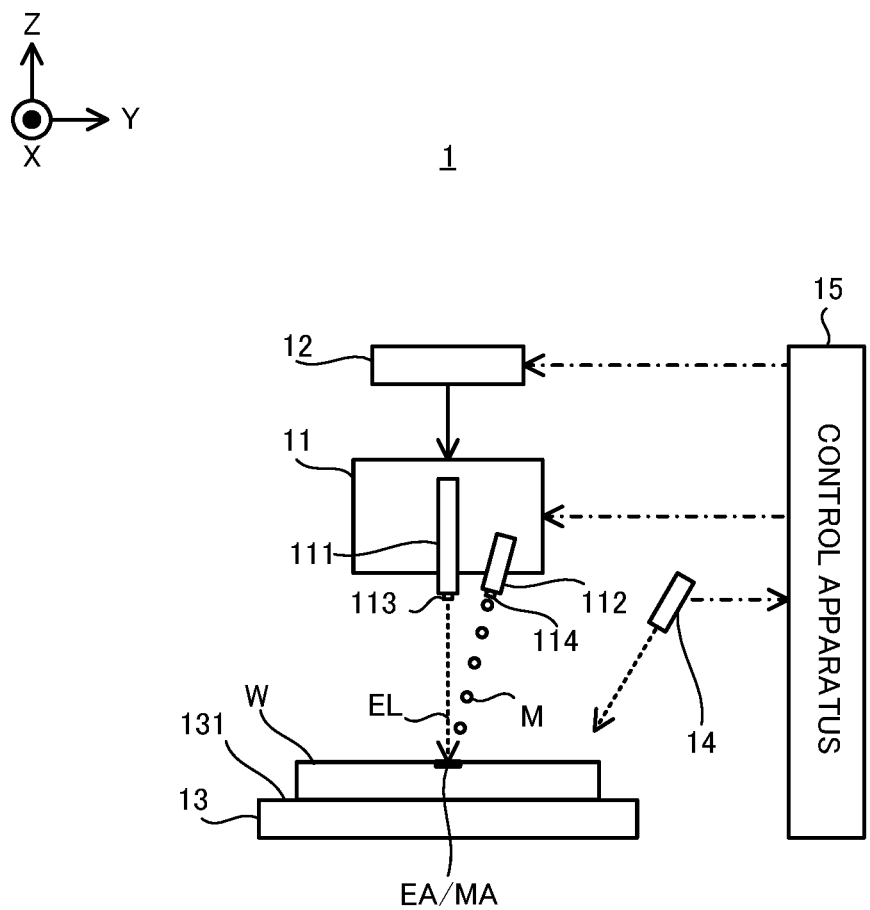
FIG. 1 is a cross-sectional view that illustrates a structure of a build system in the present embodiment.

Firstly, with reference to FIG. 1, an entire structure of the build system 1 in the present embodiment will be described. FIG. 1 is a cross-sectional view that illustrates one example of the structure of the build system 1 in the present embodiment.

The build system 1 is configured to form a three-dimensional structural object ST (namely, a three-dimensional object having a size in each of three-dimensional directions, and a solid object, in other words, an object having a size in X, Y and Z directions). The build system 1 is configured to form the three-dimensional structural object ST on a workpiece W that is a base (namely, a base member) for forming the three-dimensional structural object ST. The build system 1 is configured to form the three-dimensional structural object ST by performing the additive processing on the workpiece W. When the workpiece W is a below described stage 13, the build system 1 is configured to form the three-dimensional structural object ST on the stage 13. When the workpiece W is an existing structural object held by the stage 13, the build system 1 is configured to form the three-dimensional structural object ST on the existing structural object. In this case, the build system 1 may form the three-dimensional structural object ST that is integrated with the existing structural object. An operation for forming the three-dimensional structural object ST that is integrated with the existing structural object is equivalent to an operation for adding a new structural object to the existing structural object. Alternatively, the build system 1 may form the three-dimensional structural object ST that is separable from the existing structural object. Note that FIG. 1 illustrates an example in which the workpiece W is an existing structural object held by the stage 13. The below described description also uses the example in which the workpiece W is an existing structural object held by the stage 13.

As described above, the build system 1 is configured to form the build object by the Laser Metal Deposition. Namely, it can be said that the build system 1 is a 3D printer that forms an object by using an Additive layer manufacturing technique. Note that the Additive layer manufacturing technique may be referred to as a Rapid Prototyping, a Rapid Manufacturing or an Additive Manufacturing.

The build system 1 forms the build object by processing the build materials M with a light EL. At least one of an infrared light, a visible light and an ultraviolet light is usable as the light EL, for example. However, another type of light may be used. The light EL is a laser light. Moreover, the build material M is a material that is molten by an irradiation of a light EL having a predetermined intensity or more intensity. At least one of a metal material and a resin material is usable as the build material M, for example. However, another material that is different from the metal material and the resin material may be used as the build material M. The build materials M are powder-like or grain-like materials. Namely, the build materials M are powdery or granular materials. The build materials M, however, may not be the powdery or granular materials, and a wire-like build materials or a gas-like material may be used, for example. Note that the build system 1 may form a build object by processing the build materials M with an energy beam such as charged particle beam.

In order to process the build materials M, a build apparatus 4 is provided with a build head 11, a head driving system 12, the stage 13, a measurement apparatus 14, and a control apparatus 15. The build apparatus 4 may house the build head 11, the head driving system 12, the stage 13, and the measurement apparatus 14 in a not-illustrated chamber. Here, an inner space of the chamber may be purged by inert gas such as Nitrogen gas or Argon gas. Moreover, the build head 11 is provided with an irradiation system 111 and a material nozzle 112 (namely, a supply system that supplies the build materials M).

The irradiation system 111 is an optical system (for example, a condensing optical system) for emitting the light EL from an emitting part 113. Specifically, the irradiation system 111 is optically connected to a not-illustrated light source that generates the light EL through a not-illustrated light transmitting member such as an optical fiber. The irradiation system 111 emits the light EL propagated from the light source through the light transmitting member. The irradiation system 111 emits the light EL downward (namely, toward a −Z side) from the irradiation system 111. The stage 13 is disposed below the irradiation system 111. When the workpiece W is loaded on the stage 13, the irradiation system 111 is configured to emit the light EL toward the workpiece W. Specifically, the irradiation system 111 irradiates, with the light EL, an irradiation area EA of a predetermined shape that is set on the workpiece W as an area that is irradiated with the light EL (typically, an area at which the light EL is condensed). Moreover, a state of the irradiation system 111 is switchable between a state where the light EL is emitted to the irradiation area EA and a state where the light EL is not emitted to the irradiation area EA, under the control of the control apparatus 15. Note that a direction of the light EL emitted from the irradiation system 111 is not limited to be directly below (namely, a direction that is coincident with the Z axis direction), and may be a direction that is inclined with respect to the Z axis by a predetermined angle, for example.

The material nozzle 112 has a supply outlet (namely, a supply port) 114 that supplies the build materials M. The material nozzle 112 supplies (specifically, injects, blows out or emits) the build materials M from the supply outlet 114. The material nozzle 112 is physically connected to a not-illustrated material supply apparatus that is a supply source of the build materials M through a not-illustrated powdery material transporting member such as a pipe. The material nozzle 112 supplies the build materials M supplied from the material supply apparatus through the powdery material transporting member. Note that the material nozzle 112 is illustrated to have a tube shape in FIG. 1; however, the shape of the material nozzle 112 is not limited to this shape. The material nozzle 112 supplies the build materials M downward (namely, toward the −Z side) from the material nozzle 112. The stage 13 is disposed below the material nozzle 112. When the workpiece W is loaded on the stage 13, the material nozzle 112 supplies the build materials M toward the workpiece W. Note that a moving direction of the build materials M supplied from the material nozzle 112 is a direction that is inclined with respect to the Z axis by a predetermined angle (an acute angle as one example), but may be directly below (namely, a direction that is coincident with the Z axis). A plurality of material nozzles 112 may be also provided.

In the present embodiment, the material nozzle 112 is aligned to the irradiation system 111 so as to supply the build materials M to the irradiation area EA that is irradiated with the light EL by the irradiation system 111. That is, the material nozzle 112 is aligned to the irradiation system 111 so that the irradiation area EA is coincident with (alternatively, at least partially overlaps with) a supply area MA that is set on the workpiece W as an area to which the material nozzle 112 supplies the build materials M. Note that the material nozzle 112 may be aligned so as to supply the build materials M to a melt pool MP that is formed on the workpiece W by the light EL emitted from the irradiation system 111. The material nozzle 112 may be also aligned so that the supply area MA to which the build materials M are supplied partially overlaps with an area of the melt pool MP.

The head driving system 12 moves the build head 11. The head driving system 12 moves the build head 11 along each of the X axis, the Y axis and the Z axis. The head driving system 12 may move the build head 11 along at least one of the OX direction, the OY direction and the OZ direction in addition to or instead of at least one of the X axis, the Y axis and the Z axis. The head driving system 12 includes a motor or the like, for example. When the head driving system 12 moves the build head 11, the irradiation area EA also moves, on the workpiece W, with respect to the workpiece W. Therefore, the head driving system 12 is configured to change a positional relationship between the workpiece W and the irradiation area EA (in other words, a positional relationship between the stage 13 for holding the workpiece W and the irradiation area EA) by moving the build head 11. The head driving system 12 is also configured to change a positional relationship between the workpiece W and the supply area MA (in other words, a positional relationship between the stage 13 for holding the workpiece W and the supply area MA) by moving the build head 11.

Note that the head driving system 12 may separately move the irradiation system 111 and the material nozzle 112. Specifically, for example, the head driving system 12 may be configured to adjust at least one of a position of the emitting part 113, a direction of the emitting part 113, a position of the supply outlet 114 and a direction of the supply outlet 114. In this case, the irradiation area EA that is irradiated with the light EL by the irradiation optical system 111 and the supply area MA to which the build materials M are supplied by the material nozzle 112 may be separately controlled.

The stage 13 is configured to hold the workpiece W. Moreover, the stage 13 is configured to release the held workpiece W. The above described irradiation system 111 emits the light EL in at least a part of a period when the stage 13 holds the workpiece W. Moreover, the above described material nozzle 112 supplies the build materials M in at least a part of the period when the stage 13 holds the workpiece W. Note that there is a possibility that a part of the build materials M supplied by the material nozzle 112 is scattered or drops outside the workpiece W (for example, around the stage 13) from a surface of the workpiece W. Thus, the build system 1 may be provided with a collecting apparatus that collects the build materials M scattered or dropping around the stage 13.

Figure 2:
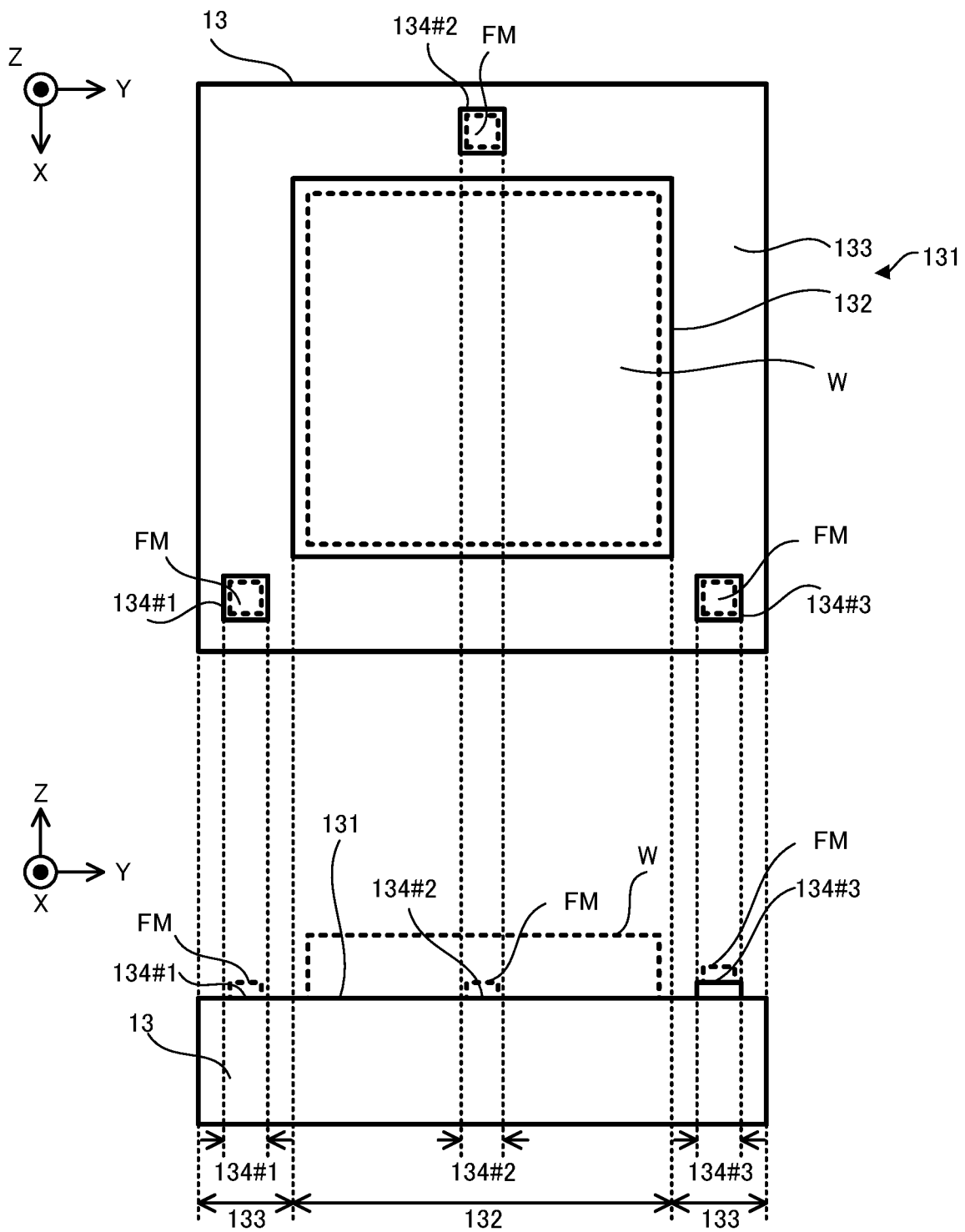
FIG. 2 is a top view that illustrates an upper surface 131 of a stage 13 and a side view that illustrates a side surface of the stage 13.

The stage 13 is provided with an upper surface (a surface on a +Z side in an example illustrated in FIG. 1) 131 that is opposable to the build head 11 in order to hold the workpiece W. The upper surface 131 includes a holding area 132 and a non-holding area 133, as illustrated in FIG. 2 including a plan view that illustrates the upper surface 131 of the stage 13 and a side view that illustrates a side surface of the stage 13. The holding area 132 is a part of the upper surface 131. Note that the holding area 132 may be all of the upper surface 131. The holding area 132 may be an area (for example, a surface) that allows the workpiece W to be held. Note that the holding area 132 may be referred to as a holding surface or a supporting surface. The holding area 132 is an area that is set on the upper surface 131 in order to hold the workpiece W. The holding area 132 may hold the workpiece W by using at least one of a mechanical chuck, a vacuum chuck, an electromagnetic chuck and electrostatic chuck and the like, for example. The holding area 132 is a rectangular area in planar view, but may be an area of another shape. The non-holding area 133 is a part of the upper surface 131. The non-holding area 133 is an area (for example, a surface) that does not hold the workpiece W. The non-holding area 133 is an area different from the holding area 132. The non-holding area 133 is a rectangular frame-shaped area in planar view, but may be an area of another shape. The non-holding area 133 may be located at the same level (namely, a position along the Z axis) as or at a different level from the holding area 132.

In the non-holding area 133, a plurality of mark areas 134 are set. In an example illustrated in FIG. 2, three mark areas 134 (specifically, a mark area 134 #1, a mark area 134 #2 and a mark area 134 #3) are set in the non-holding area 133. The plurality of mark areas 134 are set at predetermined positions in the non-holding area 133. The plurality of mark areas 134 are discretely distributed on the upper surface 131. The plurality of mark areas 134 are uniformly distributed on the upper surface 131. The plurality of mark areas 134 are distributed to surround the holding area 132. The plurality of mark areas 134 are distributed on the upper surface 131 so that the holding area 132 is disposed between at least two mark areas 134. Note that at least a part of the holding area 132 may be disposed in an area surrounded by a plurality of line segments each of which connects two of at least three mark areas 134. In the example illustrated in FIG. 2, the mark area 134 #1 is disposed on a −Y side and on a +X side of the holding area 132, the mark area 134 #2 is disposed on a −X side of the holding area 132, and the mark area 134 #3 is disposed on a +Y side and on the +X side of the holding area 132. A distribution aspect of the plurality of mark areas 134, however, is not limited to the above described distribution aspect.

At least one of the plurality of mark areas 134 may be located on the same plane as the non-holding area 133. In other words, the height of at least one of the plurality of mark areas 134 may be the same as the height of the non-holding area 133. Moreover, at least one of the plurality of mark areas 134 may be located on the same plane as the holding area 132. At least one of the plurality of mark areas 134 may be located on a different plane from the non-holding area 133. In other words, the height of at least one of the plurality of mark areas 134 may be different from the height of the non-holding area 133. Moreover, the height of at least one of the plurality of mark areas 134 may be different from the height of the holding area 132. At least one of the plurality of mark areas 134 may be located on a different plane from at least another one of the plurality of mark areas 134. In other words, the height of at least one of the plurality of mark areas 134 may be different from the height of at least another one of the plurality of mark areas 134. In the example illustrated in FIG. 2, each of the mark areas 134 #1 and 134 #2 is located on the same plane as the non-holding area 133 and the mark area 134 #3 is located on a different plane from the mark areas 134 #1 and 134 #2. In other words, in the example illustrated in FIG. 2, each of the mark areas 134 #1 and 134 #2 is located on the same plane as the holding area 132 and the mark area 134 #3 is located on a different plane from the holding area 132.

Each of the plurality of mark areas 134 is used for an alignment operation for performing alignment between the workpiece W and the build head 11. The details of the alignment operation will be described later, but its outline will be briefly described here. When the alignment operation is performed, a mark member FM is disposed at each of the plurality of mark areas 134. Each of the plurality of mark areas 134 holds the mark member FM. The build system 1 then performs the additive processing on the mark member FM, thereby forming a test mark TM corresponding to a three-dimensional object, on the mark member FM. The build system 1 then measures a state of the formed test mark TM by using the measurement apparatus 14. The build system 1 then performs the alignment between the workpiece W and the build head 11 by using a measurement result of the state of the test mark TM.

In FIG. 1 again, the measurement apparatus 14 measures a state of a measurement target. In the present embodiment, the measurement target shall be an object on the stage 13. Thus, the measurement target may include at least a part of the workpiece W, the mark member FM, the test mark TM and any other objects. The measurement apparatus 14 measures a position of the measurement target on the stage 13 as an example of the state of the measurement target. For example, the measurement apparatus 14 may measure an absolute position of the measurement target (for example, the test mark TM) on the stage 13. For example, the measurement apparatus 14 may measure a relative position of a part of the measurement target (for example, the test mark TM) with respect to another part of the measurement target (for example, the workpiece W) on the stage 13.

In order to measure the position of the measurement target (especially, a position on a surface of the measurement target), the measurement apparatus 14 may measure at least one of a shape and a size of the measurement target by using any measurement method. An example of the measurement method may be at least one of a Pattern Projection method, a Light Section method, a Time Of Flight method, a Moire Topography method (specifically, a grid irradiation method or grid projection method), a Holographic Interference method, an autocollimation method, a stereo method, an astigmatic method, a critical angle method and a knife edge method. When at least one of the position, shape and size of the measurement target on the stage 13 is discovered by the measurement of the measurement apparatus 14, it becomes clear where each part of the measurement target (for example, at least one of the workpiece W and the test mark TM) is located on the stage 13. As a result, the position of the measurement target on the stage 13 can be calculated from at least one of the position, shape and size of the measurement target.

The control apparatus 15 controls an operation of the build system 1. The control apparatus 15 may include a calculation apparatus such as at least one of a CPU (Central Processing Unit), a GPU (Graphic Processing Unit) and the like and a storage apparatus such as a memory, for example. The control apparatus 15 serves as an apparatus for controlling the operation of the build system 1 by means of the calculation apparatus executing a computer program. The computer program is a computer program that allows the control apparatus 15 (for example, the calculation apparatus)

to execute (namely, to perform) a below described operation that should be executed by the control apparatus 15. Namely, the computer program is a computer program that allows the control apparatus 15 to function so as to make the build system 1 execute the below described operation. The computer program executed by the calculation apparatus may be recorded in the storage apparatus (namely, a recording medium) of the control apparatus 15, or may be recorded in any recording medium (for example, a hard disk or a semiconductor memory) that is built in the control apparatus 15 or that is attachable to the control apparatus 15. Alternatively, the calculation apparatus may download the computer program that should be executed from an apparatus disposed outside the control apparatus 15 through a network interface. Note that the recording medium recording therein the computer program that is executed by the calculation apparatus may include a magnetic medium such as a magnetic disc or a magnetic tape, an optical disc, an optical-magnetic disc including a CD-ROM, a CD-R, a CD-RW, a flexible disc, a MO, a DVD-ROM, a DVD-RAM, a DVD-R, a DVD+R, a DVD-RW, a DVD+RW or a Blu-ray (registered trademark), a semiconductor memory such as a USB memory, and another medium that is configured to store the program. Moreover, the program includes not only the program that is stored in the above described recording medium and distributed but also a program that is distributed by a download through a network line such as an Internet and the like. Moreover, the recording medium includes a device that is configured to record the program and a device for universal use or exclusive use in which the above described program is embedded to be executable in a form of a software, a firmware or the like, for example. Moreover, various processes or functions included in the program may be executed by a program software that is executable by the computer or the process of each part may be realized by a hardware such as a predetermined gate array (a FPGA, an ASIC) or in a form in which a program software module and a partial hardware module that realizes an partial element of the hardware are combined.

Especially in the present embodiment, the control apparatus 15 controls an emitting aspect of the light EL by the irradiation system 111. The emitting aspect includes at least one of an intensity of the light EL and an emitting timing of the light EL. When the light EL is a pulse light, the emitting aspect may include at least one of a length of an ON time of the pulse light and a ratio (a duty ratio) of the ON time to an OFF time of the pulse light. Moreover, the control apparatus 15 controls a moving aspect of the build head 11 by the head driving system 12. The moving aspect includes at least one of a moving distance, a moving speed, a moving direction and a moving timing, for example. Moreover, the control apparatus 15 controls a supplying aspect of the build materials M by the material nozzle 112. The supplying aspect includes a supplied amount (especially, a supplied amount per unit time).

The control apparatus 15 may not be disposed in the build system 1, and may be disposed outside the build system 1 as a server and the like. In this case, the control apparatus 15 may be connected to the build system 1 through a wired or a wireless communication line or a network When they are physically connected through a wired line, a serial connection such as IEEE1394, RS-232x, RS-422, RS-423, RS-485 and USB, a parallel connection or an electric connection through a network such as 10-BASE-T, 100BASE-TX or 1000BASE-T may be used. When they are connected through a wireless line, a wireless LAN such as IEEE802.1x or OFDM, an electrical wave such as Bluetooth (registered trademark), an infrared ray, an optical communication or the like may be used. In this case, the control apparatus 15 and the build system 1 may be configured to transmit and receive various information through the communication line or the network. Moreover, the control apparatus 15 may be configured to transmit an information such as a command and a control parameter to the build system 1 through the above described communication line or the network. The build system 1 may be provided with a receiving apparatus that receives the information such as the command and the control parameter from the control apparatus 15 through the above described communication line or the network.

(2) Operation of Build System 1

Next, the operation of the build system 1 will be described. In the present embodiment, the build system 1 performs a build operation for forming the three-dimensional structural object ST, as described above. Moreover, the build system 1 performs the alignment operation for performing the alignment between the workpiece W and the build head 11 before performing the build operation. Thus, hereinafter, the build operation and the alignment operation for perform alignment between the workpiece W and the build head 11 will be described in order.

(2-1) Build Operation

Firstly, the build operation will be described. As described above, the build system 1 forms the three-dimensional structural object ST by the Laser Metal Deposition. Thus, the build system 1 may form the three-dimensional structural object ST by performing the existing build operation that conforms to the Laser Metal Deposition. Next, an example of the build operation of the three-dimensional structural object ST by the Laser Metal Deposition will be briefly described.

The build system 1 forms the three-dimensional structural object ST on the workpiece W on the basis of a three-dimensional model data or the like (for example, a CAD (Computer Aided Design) data) of the three-dimensional structural object ST that should be formed. The three-dimensional model data includes a data that represents a shape (especially, a three-dimensional shape) of the three-dimensional structural object ST. A measured data of the solid object measured by the measurement apparatus 14 disposed in the build system 1 may be used as the three-dimensional model data. A measured data by a three-dimensional shape measurement apparatus disposed separately from the build system 1 may be used as the three-dimensional model data. At least one of a contact-type of three-dimensional measurement apparatus having a probe that is movable relative to the workpiece W and is allowed to contact the workpiece W and a non-contact-type of three-dimensional measurement apparatus is one example of the three-dimensional shape measurement apparatus. A Pattern Projection type of three-dimensional measurement apparatus, a Light Section type of three-dimensional measurement apparatus, a Time Of Flight type of three-dimensional measurement apparatus, a Moire Topography type of three-dimensional measurement apparatus, a Holographic Interference type of three-dimensional measurement apparatus, a CT (Computed Tomography) type of three-dimensional measurement apparatus and a MRI (Magnetic Resonance Imaging) type of three-dimensional measurement apparatus and the like) is one example of the non-contact-type of three-dimensional measurement apparatus. A design data of the three-dimensional structural object ST may be used as the three-dimensional model data.

In order to form the three-dimensional object ST, for example, the build system 1 sequentially forms a plurality of layered partial structural objects (which is referred to as a "structural layer" in the below described description) SL that are arranged along the Z axis direction. For example, the build system 1 sequentially forms, one by one in order, the plurality of structural layers SL that are obtained by slicing the three-dimensional structural object ST along the Z axis direction. As a result, the three-dimensional structural object ST that is a layered structural body in which the plurality of structural layers SL are laminated is formed. Next, a flow of an operation for forming the three-dimensional structural object ST by forming the plurality of structural layers SL one by one in order will be described.

Figure 3A:
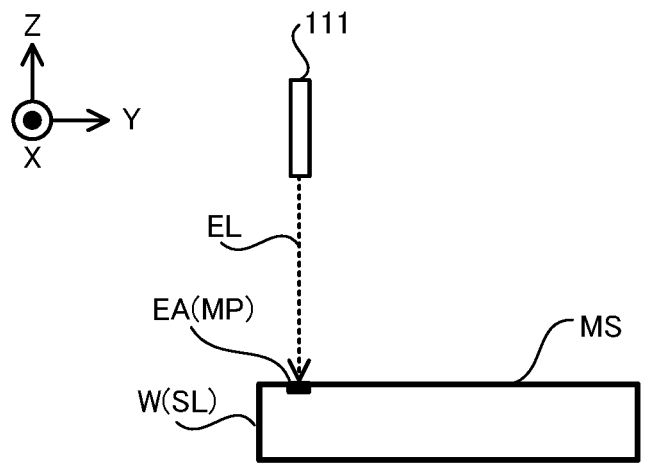
FIG. 3 Each of FIG. 3A to FIG. 3C is a cross-sectional view that illustrates an aspect in which a certain area on a workpiece is irradiated with a light and build materials are supplied thereto.
Figure 3B:
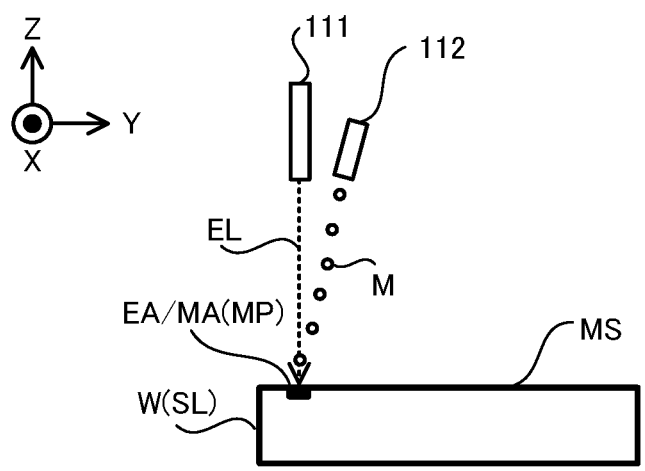
Figure 3C:
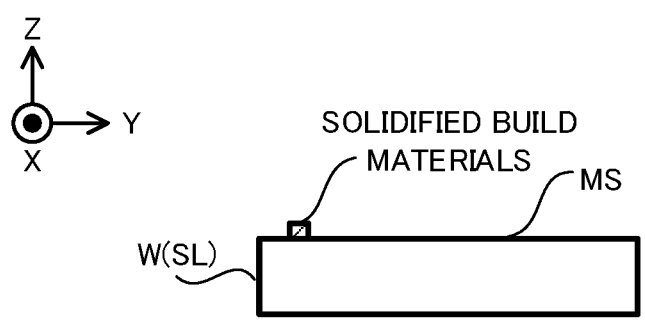

Firstly, an operation for forming each structural layer SL will be described. The build system 1 sets the irradiation area EA at a desired area on the build surface MS that corresponds to a surface of the workpiece W or a surface of the formed structural layer(s) SL, and emits the light EL from the irradiation system 111 to the irradiation area EA, under the control of the control apparatus 7. Note that an area occupied on the build surface MS by the light EL emitted from the irradiation system 111 may be referred to as the irradiation area EA. In the present embodiment, a light concentration position (namely, a condensed position, or in other words, a position at which the light EL is condensed most along the Z axis direction or a propagation direction of the light EL) of the light EL is coincident with the build surface MS. Note that the light concentration position of the light EL may be set at a position that is away from the build surface MS in the Z axis direction. As a result, as illustrated in FIG. 3A, the melt pool (namely, a pool of a liquid metal or resin molten by the light EL) MP is formed at the desired area on the build surface MS by the light EL emitted from the irradiation system 111. Moreover, the build system 1 sets the supply area MA at the desired area on the build surface MS and supplies the build materials M to the supply area MA from the material nozzle 112 under the control of the control apparatus 15. Here, since the irradiation area EA is coincident with the supply area MA as described above, the supply area MA is set at an area at which the melt pool MP is formed. Thus, the build system 1 supplies the build materials M to the melt pool MP from the material nozzle 112, as illustrated in FIG. 3B. As a result, the build materials M supplied to the melt pool MP are molten. When the melt pool MP is no longer irradiated with the light EL due to the movement of the build head 11, the build materials M molten in the melt pool MP are cooled and solidified (namely, coagulated) again. As a result, as illustrated in FIG. 3C, the solidified build materials M are deposited on the build surface MS. Namely, a build object is formed by a deposition of the solidified build materials M. Namely, the build object is formed by performing the additive processing for adding the deposition of the build materials M to the build surface MS.

A series of build process including the formation of the melt pool MP by the irradiation of the light EL, the supply of the build materials M to the melt pool MP, the melting of the supplied build materials M and the solidification of the molten build materials M is repeated while moving the build head 11 along the XY plane relative to the build surface MS. When the build head 11 moves relative to the build surface MS, the irradiation area EA also moves relative to the build surface MS. Therefore, the series of the build process is repeated while moving the irradiation area EA along the XY plane relative to the build surface MS. In this case, the irradiation area EA that is set at an area on which the build object should be formed is selectively irradiated with the light EL, but the irradiation area EA that is set at an area on which the build object should not be formed is not selectively irradiated with the light EL. Note that it can be said that the irradiation area EA is not set at the area on which the build object should not be formed. Namely, the build system 1 moves the irradiation area EA along a predetermined moving trajectory on the build surface MS and irradiates the build surface MS with the light EL at a timing on the basis of a distribution pattern of an area on which the build object should be formed (namely, a pattern of the structural layer SL). As a result, the structural layer SL that is an aggregation of the build object of the solidified build materials M is formed on the build surface MS. Note that the irradiation area EA is moved relative to the build surface MS in the above described description; however, the build surface MS may be moved relative to the irradiation area EA.

Figure 4A:
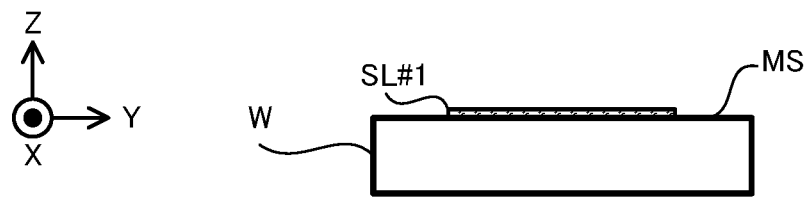
FIG. 4 Each of FIG. 4A to FIG. 4C is a cross-sectional view that illustrates a process for forming a three-dimensional structural object.
Figure 4B:
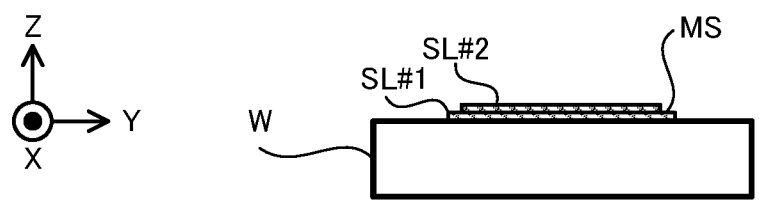
Figure 4C:
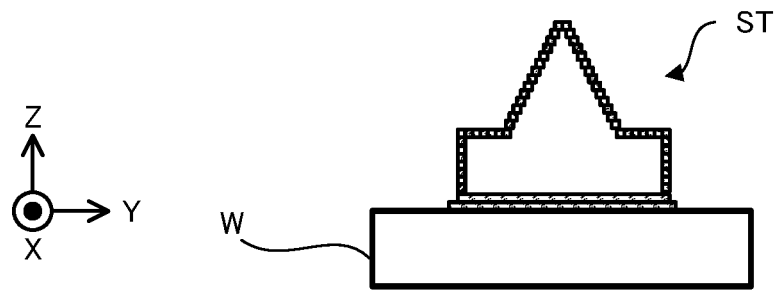

The build system 1 repeats the operation for forming the structural layer SL on the basis of the three-dimensional model data under the control of the control apparatus 15. Specifically, the control apparatus 15 firstly generates a slice data by performing a slicing process on the three-dimensional model data by a layer pitch. Note that the control apparatus 15 may modify at least a part of the slice data on the basis of a characteristic of the build system 1. The build system 1 performs an operation for forming a first structural layer SL #1 on the build surface MS that corresponds to the surface of the workpiece W on the basis of the three-dimensional model data corresponding to the structural layer SL #1 (namely, the slice data corresponding to the structural layer SL #1) under the control of the control apparatus 15. As a result, as illustrated in FIG. 4A, the structural layer SL #1 is formed on the build surface MS. Then, the build system 1 sets the surface (namely, the upper surface) of the structural layer SL #1 to a new build surface MS and forms a second structural layer SL #2 on the new build surface MS. In order to form the structural layer SL #2, firstly, the control apparatus 15 controls the head driving system 12 so that the build head 11 moves along the Z axis. Specifically, the control apparatus 15 controls the head driving system 12 to move the build head 11 toward the +Z axis side so that the irradiation area EA and the supply area MA are set on the surface of the structural layer SL #1 (namely, the new build surface MS). By this, the light concentration position of the light EL is coincident with the new build surface MS. Then, the build system 1 forms the structural layer SL #2 on the structural layer SL #1 on the basis of the slice data corresponding to the structural layer SL #2 by the operation that is same as the operation for forming the structural layer SL #1 under the control of the control apparatus 15. As a result, as illustrated in FIG. 4B, the structural layer SL #2 is formed. Then, same operation is repeated until all structural layers SL constituting the three-dimensional structural object ST that should be formed on the workpiece W are formed. As a result, the three-dimensional structural object ST is formed by a layered structural object in which the plurality of structural layers SL are laminated along the Z axis (namely, along a direction from a bottom surface to an upper surface of the melt pool MP), as illustrated in FIG. 4C.

Note that after at least one structural layer SL is formed and before all the structural layers SL are formed, the measurement apparatus 14 may measure the shape of the structural object (for example, the shape of its surface) including the formed structural layer(s) SL. In this case, the control apparatus 15 may correct at least a part of the slice data used for the formation of the structural layer SL, which is subsequentially performed, on the basis of the measurement result of the measurement apparatus 14.

(2-2) Alignment Operation

Next, the alignment operation will be described. The alignment operation is an operation for performing the alignment between the workpiece W and the build head 11, as described above. More specifically, the alignment operation is an operation for performing the alignment between the workpiece W and the build head 11 so as to make it possible relatively accurately form a desired three-dimensional structural object ST (namely, to form the three-dimensional structural object ST having a relatively small shape error compared to an ideal three-dimensional structural object ST indicated by the three-dimensional model data). The alignment between the workpiece W and the build head 11 may mean a control (in other words, adjustment or setting) of a relative positional relationship between the workpiece W and the build head 11, for example. Moreover, the alignment between the workpiece W and the build head 11 may mean a control (in other words, adjustment or setting) of a relative positional relationship between the workpiece W and a build position, for example. Note that the alignment between the workpiece W and the build head 11 may mean a control (in other words, adjustment or setting) of a relative positional relationship between the workpiece W and a position of the melt pool, for example, and may mean a control (in other words, adjustment or setting) of a relative positional relationship between the workpiece W and the irradiation area EA, and may mean a control (in other words, adjustment or setting) of a relative positional relationship between the workpiece W and the supply area MA.

In the present embodiment, the alignment operation includes a head moving operation for moving the build head 11 to a build start position Ch_start in a head coordinate system Ch. The head coordinate system Ch is a three-dimensional coordinate system indicating a position of the build head 11. A position in the head coordinate system Ch is specified by using a coordinate Xh along the X axis of the head coordinate system Ch, a coordinate Yh along the Y axis of the head coordinate system Ch, and a coordinate Zh along the Z axis of the head coordinate system Ch; namely, a position in the head coordinate system Ch is specified by coordinates (Xh, Yh, Zh). The head coordinate system Ch is used mainly to specify (in other words, represent) the position of the build head 11, by the control apparatus 15 that controls the head driving system 12, when the head driving system 12 moves the build head 11.

The build start position Ch_start is the position of the build head 11 that allows the light EL to be emitted to a build start position Cs_start at which the build (namely, additive processing) should be started on the build surface MS that corresponds to the surface of the workpiece W. In the below described description, the build surface MS that corresponds to the surface of the workpiece W will be referred to as a "workpiece build surface MSW" to be distinguished from the build surface MS that corresponds to the surface of the structural layer SL. That is, the build start position Ch_start is the position of the build head 11 that allows the irradiation area EA to be set (in other words, that allows the melt pool MP to be formed or that allows the additive processing to be performed) at the build start position Cs_start on the workpiece build surface MSW. Note that the build start position Ch_start may be the position of the build head 11 that allows the supply area MA to be formed at the build start position Cs_start on the workpiece build surface MSW.

The build start position Cs_start is a position in a stage coordinate system Cs based on the stage 13 for holding the workpiece W. The stage coordinate system Cs is a three-dimensional coordinate system based on the stage 13. Therefore, a position in the stage coordinate system Cs is specified by using a coordinate Xs along the X axis of the stage coordinate system Cs, a coordinate Ys along the Y axis of the stage coordinate system Cs, and a coordinate Zs along the Z axis of the stage coordinate system Cs; namely, a position in the stage coordinate system Cs is specified by coordinates (Xs, Ys, Zs). The stage coordinate system Cs is used mainly to specify (in other words, represent) the position of the measurement target on the stage 13, by the measurement apparatus 14 (and moreover, the control apparatus 15 that processes the measurement result of the measurement apparatus 14), when the measurement apparatus 14 measures a characteristic of the measurement target on the stage 13.

Here, a technical reason for performing such an alignment operation will be described. First, suppose that the additive processing is performed on a certain workpiece W. In this case, the control apparatus 15 specifies the position of the workpiece W in the stage coordinate system Cs from the measurement result of the measurement apparatus 14. As a result, the control apparatus 15 specifies the build start position Cs_start on the workpiece build surface MSW in the stage coordinate system Cs. On the other hand, there is a possibility that the control apparatus 15 does not relatively accurately specify the build start position Ch_start on the basis of the build start position Cs_start. This is because the head coordinate system Ch and the stage coordinate system Cs do not always have an ideal relationship. Note that the ideal relationship herein may mean, for example, that a positional relationship between the origin of the head coordinate system Ch and the origin of the stage coordinate system Cs does not change at all, that the scale of the head coordinate system Ch and the scale of the stage coordinate system Cs are always the same, and that the X axis, Y axis, and Z axis of the head coordinate system Ch are always parallel to the X axis, Y axis, and Z axis of the stage coordinate system Cs, respectively. That is, the ideal relationship herein may mean, for example, that the stage coordinate system Cs is not moved in parallel to the head coordinate system Ch, that the stage coordinate system Cs is not enlarged or reduced with respect to the head coordinate system Ch, and that that the stage coordinate system Cs is not rotated with respect to the head coordinate system Ch. When there is an ideal build system in which the head coordinate system Ch and the stage coordinate system Cs always have an ideal relationship, the control apparatus 15 can relatively accurately specify the build start position Ch_start from the build start position Cs_start on the basis of the ideal relationship between head coordinate system Ch and the stage coordinate system Cs. In reality, however, the relationship between the head coordinate system Ch and the stage coordinate system Cs may change. For example, when there is at least one of a mounting error of the build head 11, a variation in the mounting position of the build head 11 (for example, rattling, etc.) and a deterioration in the performance of the build head 11, there is a possibility of a change in the relationship between the head coordinate system Ch and the stage coordinate system Cs. Particularly, when there is at least one of a mounting error of the irradiation system 111, a variation in the mounting position of the irradiation system 111 (for example, rattling, etc.), a deterioration in the performance of the irradiation system 111, a mounting error of the material nozzle 112, a variation in the mounting position of the material nozzle 111 (for example, rattling, etc.), a breakage of the material nozzle 112, and a deterioration in the performance of the material nozzle 112, there is a possibility a change in the relationship between the head coordinate system Ch and the stage coordinate system Cs. Moreover, for example, when there is at least one of a mounting error of the stage 13, a variation in the mounting position of the stage 13 (for example, rattling, etc.) and a shape change of the stage 13, there is a possibility of a change in the relationship between the head coordinate system Ch and the stage coordinate system Cs. Furthermore, for example, when the head driving system 12 is reset (namely, restarted), there is a possibility of a change in the relationship between the head coordinate system Ch and the stage coordinate system Cs. In this manner, when the relationship between the head coordinate system Ch and the stage coordinate system Cs changes so that the relationship is no longer ideal, the light EL from the build head 11 located at a certain position on the head coordinate system Ch does not always reach the same position on the stage coordinate system Cs, compared to the case where the relationship between the head coordinate system Ch and the stage coordinate system Cs is ideal. Thus, even when the control apparatus 15 specifies the build start position Cs_start in the stage coordinate system Cs, the control apparatus 15 cannot always specify the build start position Ch_start, which is the position of the build head 11 that allows the build start position Cs_start to be irradiated with the light EL, relatively accurately, on the basis of the specified build start position Cs_start. That is, even when the control apparatus 15 specifies the build start position Cs_start in the stage coordinate system Cs, the control apparatus 15 cannot always appropriately move the build head 11 to the build start position Ch_start that corresponds to the specified build start position Cs_start in the head coordinate system Ch. Specifically, for example, even when the control apparatus 15 specifies the build start position Cs_start in the stage coordinate system Cs, there is a possibility that the control apparatus 15 moves the build head 11 to a position that is different from the build start position Ch_start that corresponds to the specified build start position Cs_start in the head coordinate system Ch. As a result, the shape accuracy of the formed three-dimensional structural object ST may deteriorate.

Thus, in the present embodiment, the build system 1 performs the alignment operation under the control of the control apparatus 15 for the purpose of appropriately moving the build head 11 to the build start position Ch_start that corresponds to the build start position Cs_start. The build system 1 then starts the additive processing for the workpiece W after the build head 11 is located at the build start position Ch_start. Therefore, the build system 1 performs the alignment operation before starting the build operation for performing the additive processing on the workpiece W.

In the present embodiment, the alignment operation performs, in addition to the head moving operation described above, an initial setting operation corresponding to a preparatory operation for performing the head moving operation described above. Thus, the initial setting operation and the head moving operation will be sequentially described below.

(2-2-1) Initial Setting Operation

Firstly, the initial setting operation of the alignment operation will be described. The initial setting operation includes an operation for associating (in other words, correlating) the head coordinate system Ch with the stage coordinate system Cs. Specifically, the initial setting operation includes an operation for associating a position in the head coordinate system Ch with a position in the stage coordinate system Cs. As an example, the initial setting operation may include an operation for associating the position of the build head 11 in the head coordinate system Ch with the position of the build object formed on the stage 13 by the build head 11 in the stage coordinate system Cs.

In the present embodiment, the operation for associating the head coordinate system Ch and the stage coordinate system Cs may include an operation for calculating a transformation matrix T that allows the position in the head coordinate system Ch specified by the coordinates (Xh, Yh, Zh) to be transformed to the position in the stage coordinate system Cs specified by the coordinates as (Xs, Ys, Zs) and/or that allows the position in the stage coordinate system Cs to be transformed to the position in the head coordinate system Ch. That is, the operation for associating the head coordinate system Ch with the stage coordinate system Cs may include an operation for calculating the transformation matrix T that satisfies relationships of (Xh, Yh, Zh)=T×(Xs, Ys, Zs) and (Xs, Ys, Zs)=T$^{-1}$×(Xh, Yh, Zh). The transformation matrix T contains a matrix related to scaling for enlarging or reducing one of the position in the head coordinate system Ch and the position in the stage coordinate system Cs and transforming it to the other of the position in the head coordinate system Ch and the position in the stage coordinate system Cs. In addition to or instead of the matrix related to scaling, however, the transformation matrix T may contain a matrix related to parallel translation for moving in parallel one of the position in the head coordinate system Ch and the position in the stage coordinate system Cs and transforming it to the other of the position in the head coordinate system Ch and the position in the stage coordinate system Cs. In addition to or instead of the matrix related to scaling, the transformation matrix T may contain a matrix related to rotation for rotating one of the position in the head coordinate system Ch and the position in the stage coordinate system Cs and transforming it to the other of the position in the head coordinate system Ch and the position in the stage coordinate system Cs. Note that the transformation matrix T may contain a matrix related to orthogonality in addition to or instead of the matrix related to at least one of scaling, parallel translation, and rotation. The operation of calculating the transformation matrix T will be described below with reference to FIG. 5.

Figure 5:
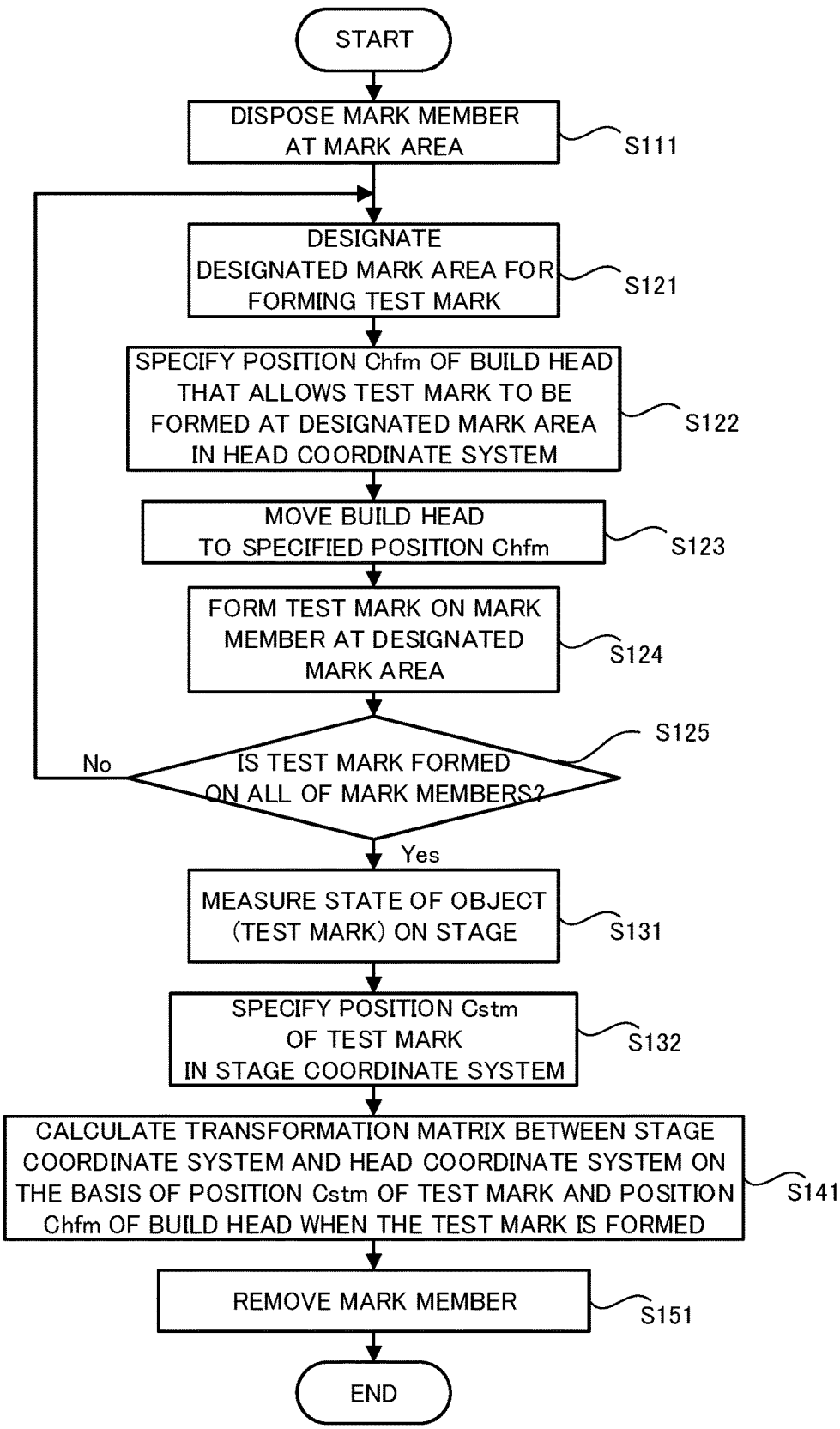
FIG. 5 is a flowchart that illustrates a flow of an initial setting operation in an alignment operation.

As illustrated in FIG. 5, firstly, the mark member FM is disposed at each of the plurality of mark areas 134 of the stage 13 (step S111). The mark member FM is a member that is at least partially meltable by the irradiation of the light EL. The mark member FM is a member that allows the melt pool MP to be formed on at least a part thereof by the irradiation of the light EL. The mark member FM is a member that allows the build object to be formed on at least a part thereof by the irradiation of the light EL. The mark member FM is, for example, a plate-like member, but may be a member of any other shape. The size of the mark member FM may be the same as, smaller than, or larger than the size of the mark area 134. The workpiece W may or may not be disposed on the stage 13 while the initial setting operation is performed.

After that, the control apparatus 15 designates one of the plurality of mark areas 134 as a designated mark area 134d at which the mark member FM for forming the test mark TM is disposed (step S121). Note that the control apparatus 15 may designate all of the plurality of mark areas 134 as the designated mark area 134d, or may designate a part of the plurality of mark areas 134 as the designated mark area 134d. The control apparatus 15 then specifies a position Chfm of the build head 11 that allows the additive processing to be performed on the mark member FM disposed at the designated mark area 134d in the head coordinate system Ch (step S122). Specifically, the plurality of mark areas 134 are set at predetermined positions (namely, known positions) on the upper surface 131 of the stage 13. That is, the designated mark area 134d is also set at a predetermined position (namely, a known position) on the upper surface 131 of the stage 13. Thus, a position Csfm of the designated mark area 134d in the stage coordinate system Cs (for example, the position Csfm of the center, end or edge, or any other part of the designated mark area 134d) is a known information to the control apparatus 15. On the other hand, as described above, since the relationship between the head coordinate system Ch and the stage coordinate system Cs changes in the build system 1, it is not easy for the control apparatus 15 to relatively accurately specify the position Chfm of the build head 11 that allows the additive processing to be performed on the mark member FM disposed at the designated mark area 134d, on the basis of the position Csfm of the designated mark area 134d. In the initial setting operation, however, it is sufficient for the build system 1 to form the test mark TM somewhere on the mark member FM (for example, at any position on the upper surface of the mark member FM). In other words, the build system 1 does not need to relatively accurately control a formation position of the test mark TM on the mark member FM. Thus, the control apparatus 15 may specify (here, substantially, estimate) the position Chfm of the build head 11 that allows the additive processing to be performed on the mark member FM disposed at the designated mark area 134d, on the basis of the position Csfm of the designated mark area 134d, on the assumption that the head coordinate system Ch and the stage coordinate system Cs have an ideal relationship.

However, when the relationship between the head coordinate system Ch and the stage coordinate system Cs is not ideal (especially, when the relationship is relatively significantly different from the ideal relationship), there is a possibility that the build system 1 cannot form the test mark TM on the mark member FM. That is, the build system 1 may form the test mark TM at a position away from the mark member FM. Therefore, the size of the mark area 134 (especially, the size along the XY plane) may be set large enough to allow the build head 11 located at the position Chfm to form the test mark TM on the mark member FM disposed at the designated mark area 134d, even when the relationship between the head coordinate system Ch and the stage coordinate system Cs deviates from the ideal relationship (especially, even when the deviation is caused to the extent that it may occur in the actual build system 1, the same shall apply hereinafter). In the same manner, the size of the mark member FM (especially, the size along the XY plane) may be set large enough to allow the build head 11 located at the position Chfm to form the test mark TM on the mark member FM disposed at the designated mark area 134d, even when the relationship between the head coordinate system Ch and the stage coordinate system Cs deviates from the ideal relationship.

Note that when the position Csfm of the designated mark area 134d is a known information, the position Chfm of the build head 11 that allows the additive processing to be performed on the mark member FM disposed at the designated mark area 134d may also a known information. Thus, the control apparatus 15 may store the information relating to the position Csfm of the mark area 134 and the position Chfm of the build head 11 that corresponds to the position Csfm of the mark area 134. In this case, the control apparatus 15 may specify the position Chfm of the build head 11 from the stored information, instead of specifying the position Chfm of the build head 11 in the step S122.

After that, the control apparatus 15 controls the head driving system 12 to move the build head 11 to the position Chfm specified in the step S122 (step S123). Then, after the build head 11 arrives at the position Chfm, the build system 1 forms the test mark TM on the mark member FM disposed at the designated mark area 134d under the control of the control apparatus 15 (step S124). The build system 1 uses a method similar to the method for forming at least one of the above described build object, the above described structural layer SL, and the above described three-dimensional structural object ST (for example, the method illustrated in FIG. 3A to FIG. 4C) to form the test mark TM. That is, the test mark TM may be a structural object similar to the above described build object, may be a structural object similar to the above described aggregation of the build object, may be a structural object similar to the above described structural layer SL, or may be a structural object similar to the above described three-dimensional structural object ST in which the plurality of structure layers SL are laminated. The test mark, however, may be a mark having at least one of a particular shape and a particular size so that the test mark TM is uniquely specified from the measurement target indicated by the measurement result of the measurement apparatus 14 when the position of the test mark TM is specified in steps S131 to S132, which will be described later.

After that, the control apparatus 15 determines whether or not the test mark TM is formed on all of a plurality of mark members FM that are disposed at a plurality of mark areas ME set on the stage 13 (step S125). As a result of the determination in step S125, when it is determined that the test mark TM is not formed on all of the mark members FM (the step S125: No), the control apparatus 15 repeats a process from the step S121. That is, the control apparatus 15 designates, as a new designated mark area 134d, one of the mark areas 134 that has not yet been designated as the designated mark area 134d (step S121). The control apparatus 15 then performs a process for forming the test mark TM on the designated mark area 134d newly designated (the steps S122 to S124).

On the other hand, as a result of the determination in the step S125, when it is determined that the test mark TM is formed on all of the mark members FM (the step S125: Yes), the measurement apparatus 14 measures the state of an object on the stage 13 (especially, the measurement target including the test mark TM) (step S131). The measurement result of the measurement apparatus 14 (namely, an information relating to the state of the measurement target including the test mark TM) is outputted to the control apparatus 15. Note that the process may move to the next step (the step S131) when it is determined that the test mark TM is formed on a part of the plurality of mark members FM, instead of the case where it is determined that the test mark TM is formed on all of the mark members FM.

After that, the control apparatus 15 specifies a position Cstm of the formed test mark TM in the stage coordinate system Cs on the basis of the measurement result of the measurement apparatus 14 (step S132). Specifically, since the test mark TM is formed under the control of the control apparatus 15, at least one of the position, shape and size of the test mark TM is an information known to the control apparatus 15. Therefore, the control apparatus 15 is allowed to specify the test mark TM from the measurement target on the basis of the information relating to the state of the measurement target (especially, at least one of the position, the shape and the size) measured by the measurement apparatus 14. For example, the control apparatus 15 may specify the test mark TM from the measurement target by using a pattern matching method or the like. The control apparatus 15 then specifies the position Cstm of the specified test mark TM in the stage coordinate system Cs.

After that, the control apparatus 15 calculates the transformation matrix T indicating the relationship between the head coordinate system Ch and the stage coordinate system Cs, on the basis of the position Cstm of the test mark TM specified in the step S132 and the position Chfm of the build head 11 when the test mark TM is formed (namely, the position Chfm of the build head 11 specified in the step S122) (step S141). Specifically, since a plurality of test marks TM are formed, a plurality of positions Cstm are specified in the step S132. In the same manner, a plurality of positions Chfm are also specified in the step S122. A position Cstm1=(Xstm1, Ystm1, Zstm1) of a first test mark TM among the plurality of positions Cstm corresponds to a position Chfm1=(Xhfm1, Yhfm1, Zhfm1) of the build head 11 when the first test mark TM is formed, among the plurality of positions Chfm. That is, a relationship of (Xhfm1, Yhfm1, Zhfm1)=T×(Xstm1, Ystm1, Zstm1) is established. In the same manner, a position Cstm2=(Xstm2, Ystm2, Zstm2) of a second test mark TM of the plurality of positions Cstm corresponds to a position Chfm2=(Xhfm2, Yhfm2, Zhfm2) of the build head 11 when the second test mark TM is formed, among the plurality of positions Chfm. That is, a relationship of (Xhfm2, Yhfm2, Zhfm2)=T×(Xstm2, Ystm2, Zstm2) is established. In the same manner, a position Cstm3=(Xstm3, Ystm3, Zstm3) of a third test mark TM among the plurality of positions Cstm corresponds to a position Chfm3=(Xhfm3, Yhfm3, Zhfm3) of the build head 11 when the third test mark TM is formed, among the plurality of positions Chfm. That is, a relationship of (Xhfm3, Yhfm3, Zhfm3)=T×(Xstm3, Ystm3, Zstm3) is established. Therefore, the control apparatus 15 may calculate the transformation matrix T by solving the simultaneous equations established between the plurality of positions Cstm and the plurality of positions Chfm.

Since each of the head coordinate system Ch and the stage coordinate system Cs is a three-dimensional coordinate system, the build system 1 may form at least three test marks TM in order to calculate the transformation matrix T. That is, at least three mark areas 134 may be set on the stage 13. In this case, the at least three mark areas 134 may include two mark areas 134 having different positions along the X axis of the stage coordinate system Cs. That is, the build system 1 may form at least two test marks TM having different positions along the X axis of the stage coordinate system Cs. The at least three mark areas 134 may include two mark areas 134 having different positions along the Y axis. That is, the build system 1 may form at least two test marks TM having different positions along the Y axis of the stage coordinate system Cs. The at least three mark areas 134 may include two mark areas 134 having different positions along the Z axis. That is, the build system 1 may form at least two test marks TM having different positions along the Z axis of the stage coordinate system Cs. In the example illustrated in FIG. 2 described above, the three mark areas 134 #1 to 134 #3 are set on the stage 13. Moreover, in the example illustrated in FIG. 2, the two mark areas 134 #1 and 134 #2 (or the two mark areas 134 #2 and 134 #3) having different positions along the X axis are set on the stage 13, and the three mark areas 134 #1 to 134 #3 having different positions along the Y axis are set on the stage 13, and the two mark areas 134 #1 and 134 #3 (or the two mark areas 134 #2 and 134 #3) having different positions along the Z axis are set on the stage 13.

When the transformation matrix T is calculated, the control apparatus 15 can transform the position (Xh, Yh, Zh) in the head coordinate system Ch to the position (Xs, Ys, Zs) in the stage coordinate system Cs that corresponds to the position (Xh, Yh, Zh). In the same manner, the control apparatus 15 can transform the position (Xs, Ys, Zs) in the stage coordinate system Cs to the position (Xh, Yh, Zh) in the head coordinate system Ch that corresponds to the position (Xs, Ys, Zs). Moreover, the transformation matrix T is calculated on the basis of the test mark TM formed by the build stem 1 actually performing the additive processing on the stage 13. That is, the transformation matrix T is calculated on the basis of the actual position Chfm of the build head 11 in the head coordinate system Ch and the actual position Cstm of the test mark TM in the stage coordinate system Cs. Therefore, the transformation matrix T reflects the actual relationship between the head coordinate system Ch and the stage coordinate system Cs. That is, even when the actual relationship between the head coordinate system Ch and the stage coordinate system Cs is different from the ideal relationship, the transformation matrix T reflects the actual relationship between the position of the build head 11 in the head coordinate system Ch and the position of the object on the stage 13 in the stage coordinate system Cs. Thus, the control apparatus 15 can relatively accurately perform a mutual transformation between the position in the head coordinate system Ch and the position in the stage coordinate system Cs by using the transformation matrix T.

After the transformation matrix T is calculated (or after the state of the test mark TM is measured), the mark member FM is removed from the mark area 134 (step S151). That is, the mark member FM corresponds to a member that can be replaced at each time when the initial setting operation is performed. The mark member FM may be located at the mark area 134 until the next initial setting operation is performed. In addition, the same mark member FM may be used in a plurality of initial setting operations.

The control apparatus 15 performs such an initial setting operation at a desired timing. For example, the control apparatus 15 may perform the initial setting operation at each time when the build system 1 starts to operate (for example, when the build system 1 is powered on). For example, the control apparatus 15 may perform the initial setting operation at each time when the workpiece W is disposed on the stage 13. For example, the control apparatus 15 may perform the initial setting operation before or after the workpiece W is disposed on the stage 13. For example, the control apparatus 15 may perform the initial setting operation at each time when the additive processing for one or a plurality of workpieces W is completed. For example, the control apparatus 15 may perform the initial setting operation at each time when a fixed time elapses after the build system 1 is activated. For example, the control apparatus 15 may perform the initial setting operation at each time when an operator of the build system 1 inputs an instruction to perform the initial setting operation.

(2-2-2) Head Moving Operation

Next, the head moving operation of the alignment operation will be described. As described above, the head moving operation is an operation for moving the build head 11 to the build start position Ch_start. Hereinafter, the head moving operation will be described with reference to FIG. 6.

Figure 6:
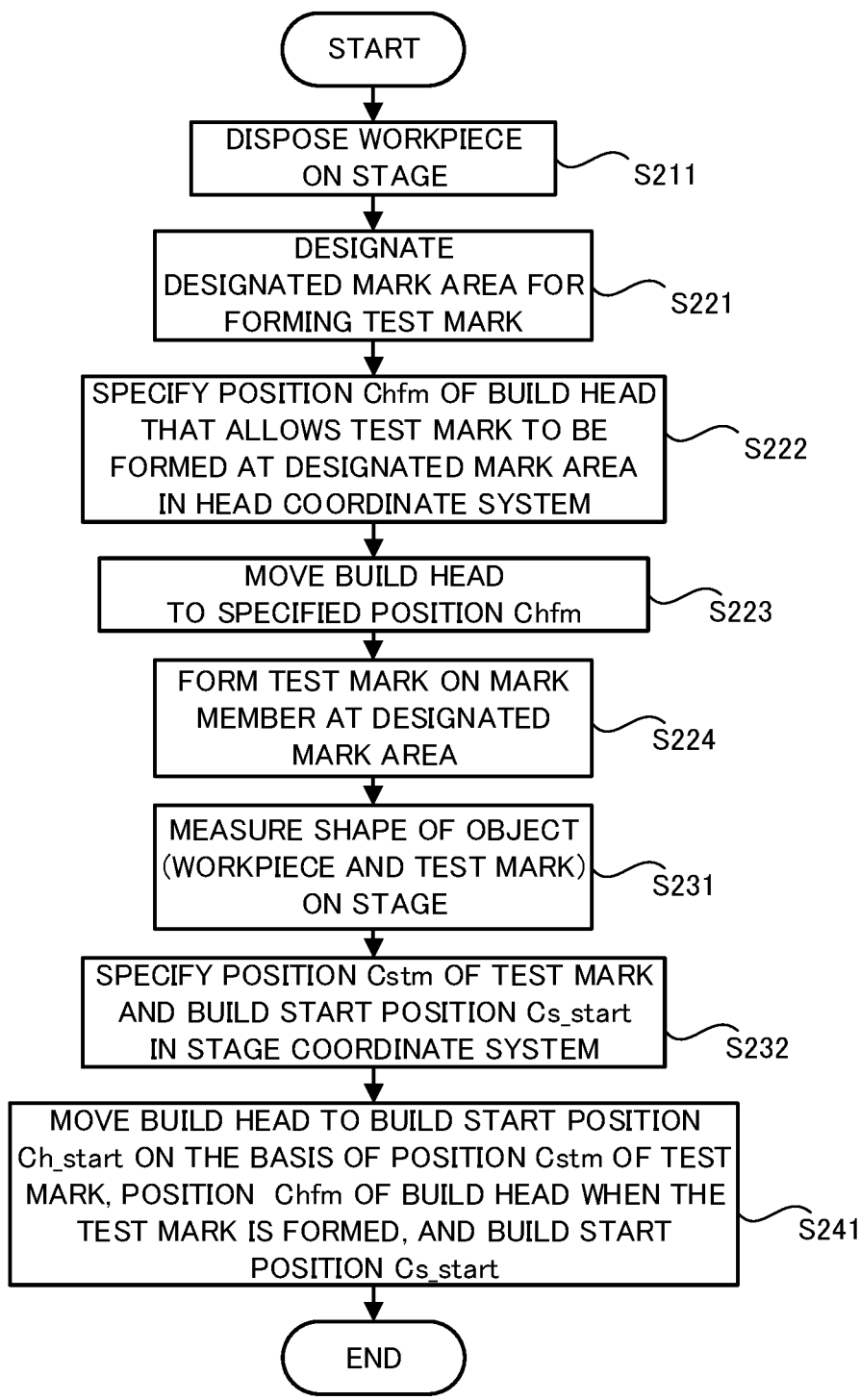
FIG. 6 is a flowchart that illustrates a flow of a head moving operation in the alignment operation.

As illustrated in FIG. 6, firstly, the workpiece W on which the additive processing should be performed is disposed on the stage 13 (step S211). The stage 13 holds the workpiece W through the holding area 132.

After that, the control apparatus 15 designates one of the plurality of mark areas 134 as the designated mark area 134d at which the mark member FM for forming the test mark TM should be disposed (step S221). The control apparatus 15 may designate all of the plurality of mark areas 134 as the designated mark area 134d, or may designate a part of the plurality of mark areas 134 as the designated mark area 134d. Then, the mark member FM is disposed at the designated mark area 134d.

After that, the control apparatus 15 specifies the position Chfm of the build head 11 that allows the additive processing to be performed on the mark member FM disposed at the designated mark area 134d in the head coordinate system Ch (step S222). Specifically, the control apparatus 15 specifies the position Chfm of the build head 11 by using the method that is used in the above described initial setting operation to specify the position Chfm of the build head 11, even in the head moving operation. That is, the control apparatus 15 specifies (here, substantially, estimates) the position Chfm of the build head 11 that allows the additive processing to be performed on the mark member FM disposed at the designated mark area 134d, on the basis of the position Csfm of the designated mark area 134d, on the assumption that S the head coordinate system Ch and the stage coordinate system Cs have an ideal relationship. The control apparatus 15, however, may specify the position Chfm of the build head 11 that allows the additive processing to be performed on the mark member FM disposed at the specified mark area 134d, by transforming the position Csfm of the designated mark area 134d, which is a known information, by using the transformation matrix T calculated in the initial setting operation.

After that, the control apparatus 15 controls the head driving system 12 to move the build head 11 to the position Chfm specified in the step S222 (step S223). Then, after the build head 11 arrives at the position Chfm, the build system 1 forms the test mark TM on the mark member FM disposed at the designated mark area 134d under the control of the control apparatus 15 (step S224). The test mark TM formed in the head moving operation may be the same as or different from the test mark TM formed in the initial setting operation described above.

After that, the measurement apparatus 14 measures the state of the object on the stage 13 (specifically, the measurement target including the test mark TM and the workpiece W) (step S231). The measurement result of the measurement apparatus 14 (namely, an information regarding the state of the measurement target including the test mark TM and the workpiece W) is outputted to the control apparatus 15.

After that, the control apparatus 15 specifies the position Cstm of the formed test mark TM in the stage coordinate system Cs on the basis of the measurement result of the measurement apparatus 14 (step S232). Specifically, the control apparatus 15 specifies the position Cstm of the test mark TM by using the method that is used in the above described initial setting operation to specify the position Cstm of the test mark TM.

Moreover, the control apparatus 15 specifies the build start position Cs_start at which the build should be started on the workpiece build surface MSW in the stage coordinate system Cs on the basis of the measurement result of the measurement apparatus 14 (step S232). Specifically, the control apparatus 15 is allowed to specify the position of the workpiece W in the stage coordinate system Cs from the measurement result of the measurement apparatus 14. Furthermore, the control apparatus 15 is allowed to specify how to form the three-dimensional structural object ST on the workpiece W on the basis of the three-dimensional model data of the three-dimensional structural object ST that should be formed. When it is specified how to form the three-dimensional structural object ST on the workpiece W, it is possible to specify a position at which the build object should be formed at first so as to form the three-dimensional structural object ST (for example, a position at which the build object should be formed at first so as to form the first structure layer SL #1). The position where the build object should be formed at first so as to form the three-dimensional structural object ST corresponds to the build start position Cs_start.

After that, the control apparatus 15 moves the build head 11 to the build start position Ch_start on the basis of the position Cstm of the test mark TM specified in the step S232, the position Chfm of the build head 11 when the test mark TM is formed (namely, the position Chfm of the build head 11 specified in the step S222), and the build start position Cs_start specified in the step S232 (step S241). Hereinafter, the operation for moving the build head 11 to the build start position Ch_start on the basis of the position Cstm of the test mark TM, the position Chfm of the build head 11, and the build start position Cs_start will be described in more detail with reference to FIG. 7.

Figure 7:
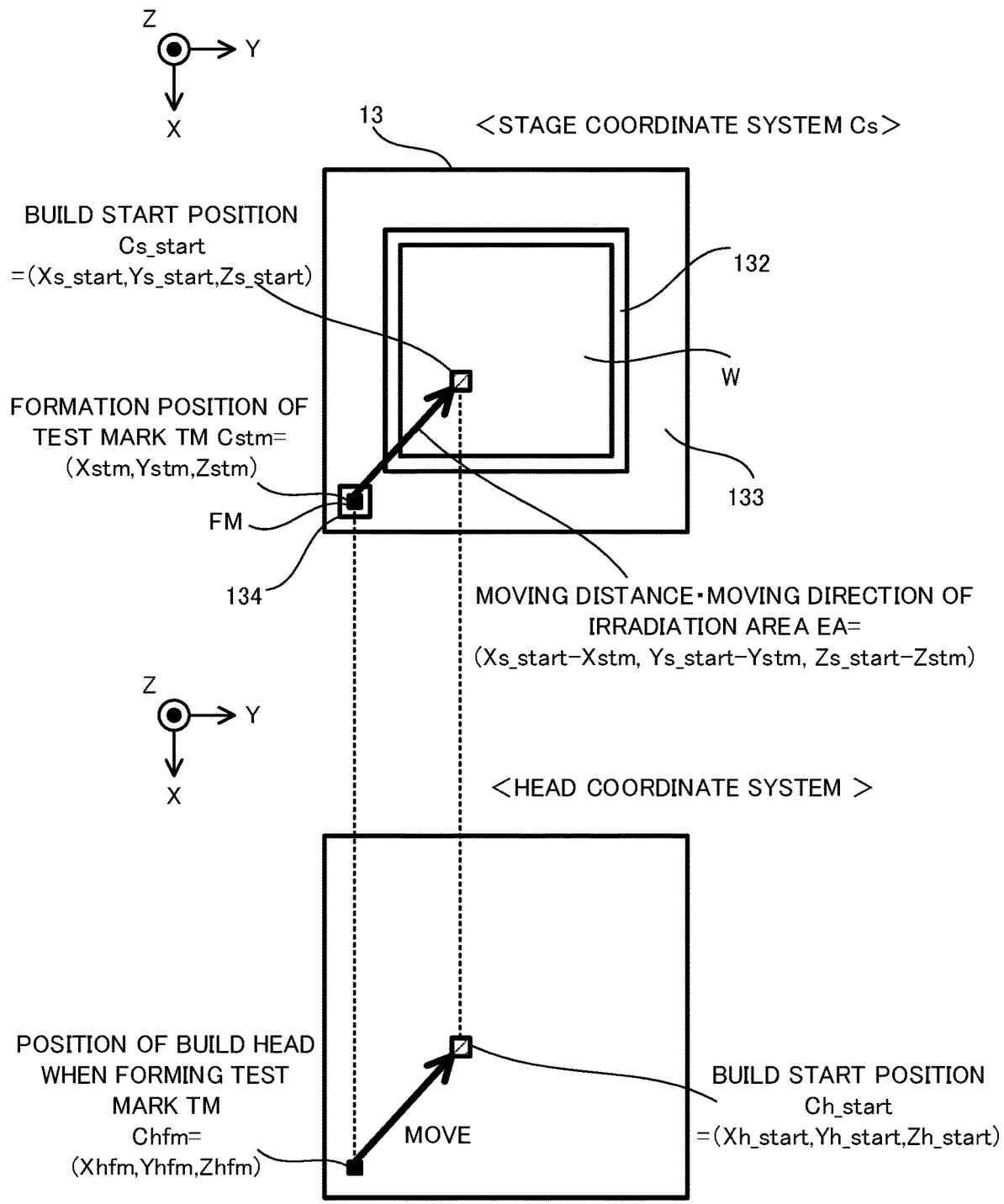
FIG. 7 is a plan view that illustrates a relationship between a position of a test mark and a build start position in a stage coordinate system, and a relationship between a position of a build head and the build start position in a head coordinate system.

An upper part of FIG. 7 is a plan view that illustrates a relationship between the position Cstm=(Xstm, Ystm, Zstm) of the test mark TM and the build start position Cs_start= (Xs_start, Ys_start, Zs_start) in the stage coordinate system Cs. On the other hand, a lower part of FIG. 7 is a plan view illustrates a relationship between the position Chfm=(Xhfm, Yhfm, Zhfm) of the build head 11 and the build start position Ch_start=(Xh_start, Yh_start, Zh_start) in the head coordinate system Ch.

As illustrated in FIG. 7, the test mark TM is formed at the position Cstm in the stage coordinate system Cs by the light EL from the build head 11 located at the position Chfm in the head coordinate system Ch. Thus, the irradiation area EA of the light EL from the build head 11 located at the position Chfm in the head coordinate system Ch is set at the position Cstm in the stage coordinate system Cs. In this case, when the build head 11 moves in the head coordinate system Ch so that the irradiation area EA moves from the position Cstm to the build start position Cs_start in the stage coordinate system Cs, the build head 11 is located at the build start position Cs_start.

Specifically, in the stage coordinate system Cs, the build start position Cs_start is away from the position Cstm of the test mark TM by a distance of (Xs_start-Xstm) along the X axis. In the stage coordinate system Cs, the build start position Cs_start is away from the position Cstm of the test mark TM by a distance of (Ys_start-Ystm) along the Y axis. In the stage coordinate system Cs, the build start position Cs_start is away from the position Cstm of the test mark TM by a distance of (Zs_start-Zstm) along the Z axis. Thus, when the build head 11 located at the position Chfm in the head coordinate system Ch moves so that the irradiation area EA moves along the X axis by a distance of (Xs_start-Xstm), moves along the Y axis by a distance of (Ys_start-Ystm), and moves along the Z axis by a distance of (Zs_start-Zstm)

in the stage coordinate system Cs, then, the build head 11 is located at the build start position Cs_start.

Here, when the build head 11 moves along the X axis by a distance of (Xs_start-Xstm), moves along the Y axis by a distance of (Ys_start-Ystm), and moves along the Z axis by a distance of (Zs_start-Zstm) in the head coordinate system Ch, then, the irradiation area EA may move from the position Cstm to the build start position Cs_start in the stage coordinate system Cs. As described above, however, the head coordinate system Ch and the stage coordinate system Cs do not always have an ideal relationship. Thus, even when the build head 11 moves along the X axis by a distance of (Xs_start-Xstm) in the head coordinate system Ch, the irradiation area EA does not always move along the X axis by a distance of (Xs_start-Xstm) in the stage coordinate system Cs. In the same manner, even when the build head 11 moves along the Y axis by a distance of (Ys_start-Ystm) in the head coordinate system Ch, the irradiation area EA does not always move along the Y axis (Ys_start-Ystm) in the stage coordinate system Cs. In the same manner, even when the build head 11 moves along the Z axis by a distance of (Zs_start-Zstm) in the head coordinate system Ch, the irradiation area EA does not always move along the Z axis by a distance of (Zs_start-Zstm) in the stage coordinate system Cs. Thus, the control apparatus 15 uses the transformation matrix T to transform a moving distance and a moving direction of the irradiation area EA that moves from the position Cstm of the test mark TM to the build start position Cs_start in the stage coordinate system Cs, to a moving distance and a moving direction of the build head 11 in the head coordinate system Ch. Then, the control apparatus 15 moves the build head 11 located at the position Chfm in the head coordinate system Ch, in the moving direction obtained by the transformation, by the moving distance obtained by the transformation. As a result, the build head 11 is located at the build start position Ch_start that allows the irradiation area EA to be at the build start position Cs_start.

As described above, in the present embodiment, the control apparatus 15 is allowed to appropriately move the build head 11 to the build start position Ch_start. That is, the control apparatus 15 is allowed to move the build head 11 so that the position of the build head 11 after the movement in the head coordinate system Ch is coincident with (or approaches) the build start position Ch_start. In other words, the control apparatus 15 is allowed to move the build head 11 so that the irradiation area EA that is irradiated with the light EL from the build head 11 after the movement is set at the build start position Cs_start. Note that the control apparatus 15 may move the build head 11 so that the melt pool MP formed by the light EL from the build head 11 after the movement is set at the build start position Cs_start. Alternatively, the control apparatus 15 may move the build head 11 so that the supply position MA by the build head 11 is set at the build start position Cs_start.

The control apparatus 15 performs such a head moving operation at a desired timing. For example, the control apparatus 15 may perform the head moving operation at each time when the workpiece W is disposed on the stage 13. For example, the control apparatus 15 may perform the head moving operation at each time when the additive processing for one or a plurality of workpieces W is completed. For example, the control apparatus 15 may perform the head moving operation at each time when a fixed time elapses after the build system 1 is activated. For example, the control apparatus 15 may perform the head moving operation at each time when the operator of the build system 1 inputs an instruction to perform the head moving operation. For example, the control apparatus 15 may perform the head moving operation at each time when the initial setting operation is performed. That is, the control apparatus 15 may perform the head moving operation with the same frequency as that of the initial setting operation. For example, the control apparatus 15 may perform the head moving operation less frequently than the initial setting operation. For example, the control apparatus 15 may perform the head moving operation more frequently than the initial setting operation.

Note that the control apparatus 15 may use the transformation matrix T to transform the build start position Cs_start in the stage coordinate system Cs to the build start position Ch_start in the head coordinate system Ch, and to move the build head 11 to the build start position Ch_start obtained by the transformation. In particular, when the transformation matrix T includes all of the above described matrix related to translation, the above described matrix related to scaling, and the above described matrix related to rotation, the control apparatus 15 may use the transformation matrix T to specify the build start position Ch_start, and to move the build head 11 to the specified build start position Ch_start. Even in this case, the control apparatus 15 is allowed to appropriately move the build head 11 to the build start position Ch_start.

(3) Modified Example

Next, modified examples of the build system 1 will be described.

(3-1) First Modified Example

Firstly, a first modified example will be described. In the first modified example, the head moving operation has a different content from that of the head moving operation described above. Specifically, the head moving operation in the first modified example is an operation for moving the build head 11 to the build start position Ch_start, as in the head moving operation described above. The head moving operation in the first modified example, however, is different from the head moving operation described above in that a plurality of types of test marks TM are formed and the build head 11 is moved to the build start position Ch_start on the basis of the position Cstm of any one of the plurality of types of test marks TM. Hereinafter, the head moving operation in the first modified example will be described with reference to FIG. 8 to FIG. 10. Note that the same steps as those of the head moving operation described above will carry the same step numbers and a detailed description thereof will be omitted.

Figure 8:
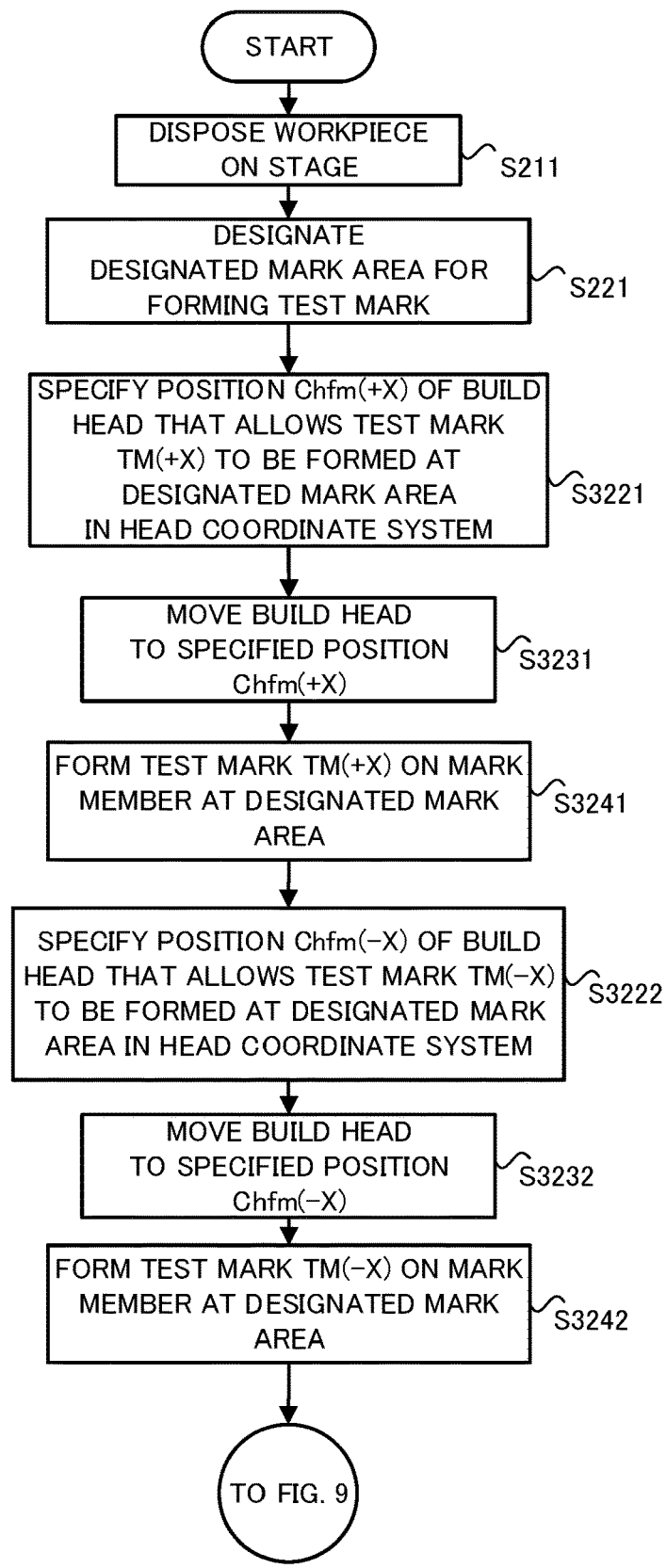
FIG. 8 is a flowchart that illustrates a flow of a part of a head moving operation in a first modified example.

As illustrated in FIG. 8, firstly, the workpiece W that should be subject to the additive processing is disposed on the stage 13 (the step S211). Moreover, the control apparatus 15 designates one of the plurality of mark areas 134 as the designated mark area 134*d* at which the mark member FM for forming the test mark TM should be disposed (the step S221). Note that the control apparatus 15 may designate all of the plurality of mark areas 134 as the designated mark area 134*d*, or may designate a part of the plurality of mark areas 134 as the designated mark area 134*d*. At this time, the mark member FM is disposed at the designated mark area 134*d*.

As described above, in the first modified example, a plurality of types of test marks TM are formed on the mark member FM disposed at the designated mark area 134*d*. Specifically, a plurality of test marks TM are formed by the build head 11 having different moving directions (especially, moving directions along the XY plane in the head coordinate system Ch) during a period of forming the test marks TM. For example, there are formed a test mark TM formed by the build head 11 that moves in a first direction and a test mark TM formed by the build head 11 that moves in a second direction that is different from the first direction (for example, that intersects with the first direction or that is opposite to the first direction). For example, there are formed the test mark TM formed by the build head 11 that moves in the first direction, the test mark TM formed by the build head 11 that moves in the second direction, and a test mark TM formed by the build head 11 that moves in a third direction that is different from the first and second directions (for example, that intersects with at least one of the first and second directions, or that is opposite to at least one of the first and second directions). For example, there are formed the test mark TM formed by the build head 11 that moves in the first direction, the test mark TM formed by the build head 11 that moves in the second direction, the test mark TM formed by the build head 11 that moves in the third direction, and a test mark TM formed by the build head 11 that moves in a fourth direction that is different from the first to third directions (for example, that intersects with at least one of the first to third directions, or that is opposite to at least one of the first to third directions).

The test mark TM formed by the build head 11 that moves in the first direction is a linear test mark TM that extends along the first direction (or a fifth direction in the stage coordinate system Cs that corresponds to the first direction in the head coordinate system Ch) along the workpiece build surface MSW. The test mark TM formed by the build head 11 that moves in the second direction is a linear test mark TM that extends along the second direction (or a sixth direction in the stage coordinate system Cs that corresponds to the second direction in the head coordinate system Ch) along the workpiece build surface MSW. The test mark TM formed by the build head 11 that moves in the third direction is a linear test mark TM that extends along the third direction (or a seventh direction in the stage coordinate system Cs that corresponds to the third direction in the head coordinate system Ch) along the workpiece build surface MSW. The test mark TM formed by the build head 11 that moves in the fourth direction is a linear test mark TM that extends along the fourth direction (or an eighth direction in the stage coordinate system Cs that corresponds to the fourth direction in the head coordinate system Ch) along the workpiece build surface MSW. Thus, in the first modified example, it can be said that a plurality of test marks TM having different extending directions along the workpiece build surface MSW are formed. Note that the extending directions of the plurality of test marks TM may not be along the work build surface MSW.

Figure 11:
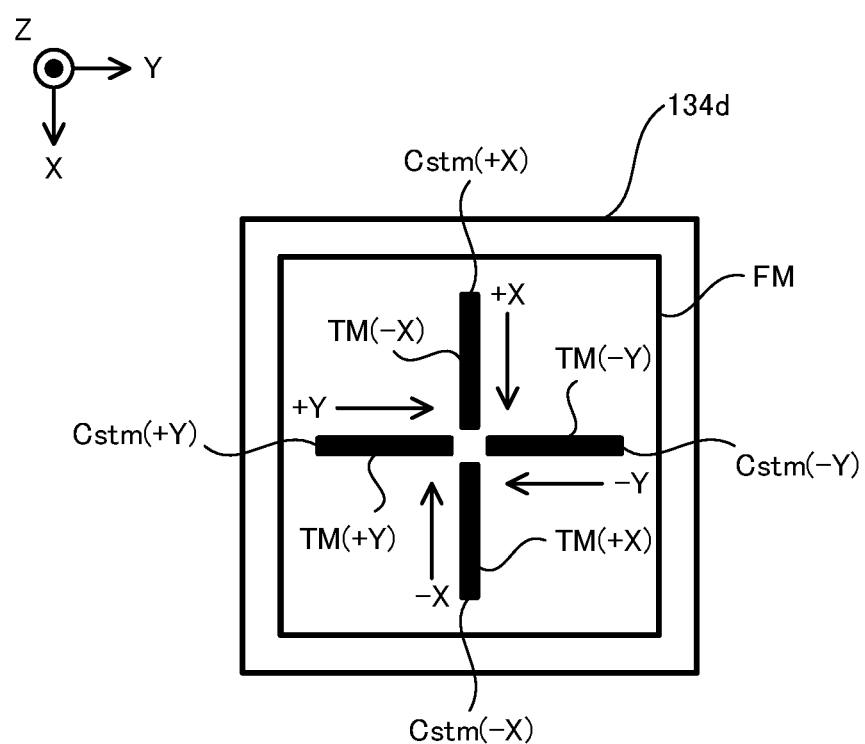
FIG. 11 is a plan view that illustrates one example of the test mark used in the first modified example.

As an example, FIG. 11 illustrates an example in which a test mark TM(+X), a test mark TM(-X), a test mark TM(+Y), and a test mark TM(-Y) are formed. The test mark TM(+X) is a test mark TM formed by the build head 11 that moves along the X axis of the head coordinate system Ch and toward the +X side of the head coordinate system Ch. The test mark TM(-X) is a test mark TM formed by the build head 11 that moves along the X axis of the head coordinate system Ch and toward the -X side of the head coordinate system Ch. The test mark TM(+Y) is a test mark TM formed by the build head 11 that moves along the Y axis of the head coordinate system Ch and toward the +Y side of the head coordinate system Ch. The test mark TM(-Y) is a test mark TM formed by the build head 11 that moves along the Y axis of the head coordinate system Ch and toward the -Y side of the head coordinate system Ch. In the following description, for convenience of description, the head moving operation that forms the four types of test marks TM illustrated in FIG. 11 (namely, the test mark TM(+X), the test mark TM(-X), the test mark TM(+Y), and the test mark TM(-Y)) will be described. In the head moving operation, however, a different number of test marks TM having different shapes and/or extending in different directions from those of the four types of test marks TM illustrated in FIG. 11 may be formed.

In FIG. 8 again, after designating the designated mark area 134*d*, the control apparatus 15 specifies a position Chfm(+X) of the build head 11 when the formation of the test mark TM(+X) is started on the mark member FM disposed at the designated mark area 134*d* in the head coordinate system Ch (step S3221). Note that a method for specifying the position Chfm(+X) in the step S3221 may be the same as the method for specifying the position Chfm in the step S222 in FIG. 6 described above. That is, the control apparatus 15 may specify the position Chfm(+X) of the build head 11 when the formation of the test mark TM(+X) is started, on the basis of the starting position Csfm(+X) when the formation of the test mark TM(+X) is started in the designated mark area 134*d* on the assumption that the head coordinate system Ch and the stage coordinate system Cs have an ideal relationship. The same applies to a method for specifying the position Chfm(-X) in a step S3222, a method for specifying the position Chfm(+Y) in a step S3223, and a method for specifying the position Chfm(-Y) in a step S3224, which will be described later.

After that, the control apparatus 15 controls the head driving system 12 to move the build head 11 to the position Chfm (+X) specified in the step S3221 (step S3231). Then, after the build head 11 arrives at the position Chfm(+X), the build system 1 forms the test mark TM(+X) on the mark member FM disposed at the designated mark area 134*d* while moving the build head 11 along the X axis of the head coordinate system Ch and toward the +X side of the head coordinate system Ch, under the control of the control apparatus 15 (step S3241).

Moreover, as illustrated in FIG. 8, before and after a process for forming the test mark TM(+X), the control apparatus 15 specifies the position Chfm(-X) of the build head 11 when the formation of the test mark TM(-X) is started on the mark member FM disposed at the designated mark area 134*d* in the head coordinate system Ch. (step S3222). The control apparatus 15 then controls the head driving system 12 to move the build head 11 to the position Chfm(-X) specified in the step S3222 (step S3232). Then, after the build head 11 arrives at the position Chfm(-X), the build system 1 forms the test mark TM(-X) on the mark member FM disposed at the designated mark area 134*d* while moving the build head 11 along the X axis of the head coordinate system Ch and toward the -X side of the head coordinate system Ch, under the control of the control apparatus 15 (step S3242).

Figure 9:
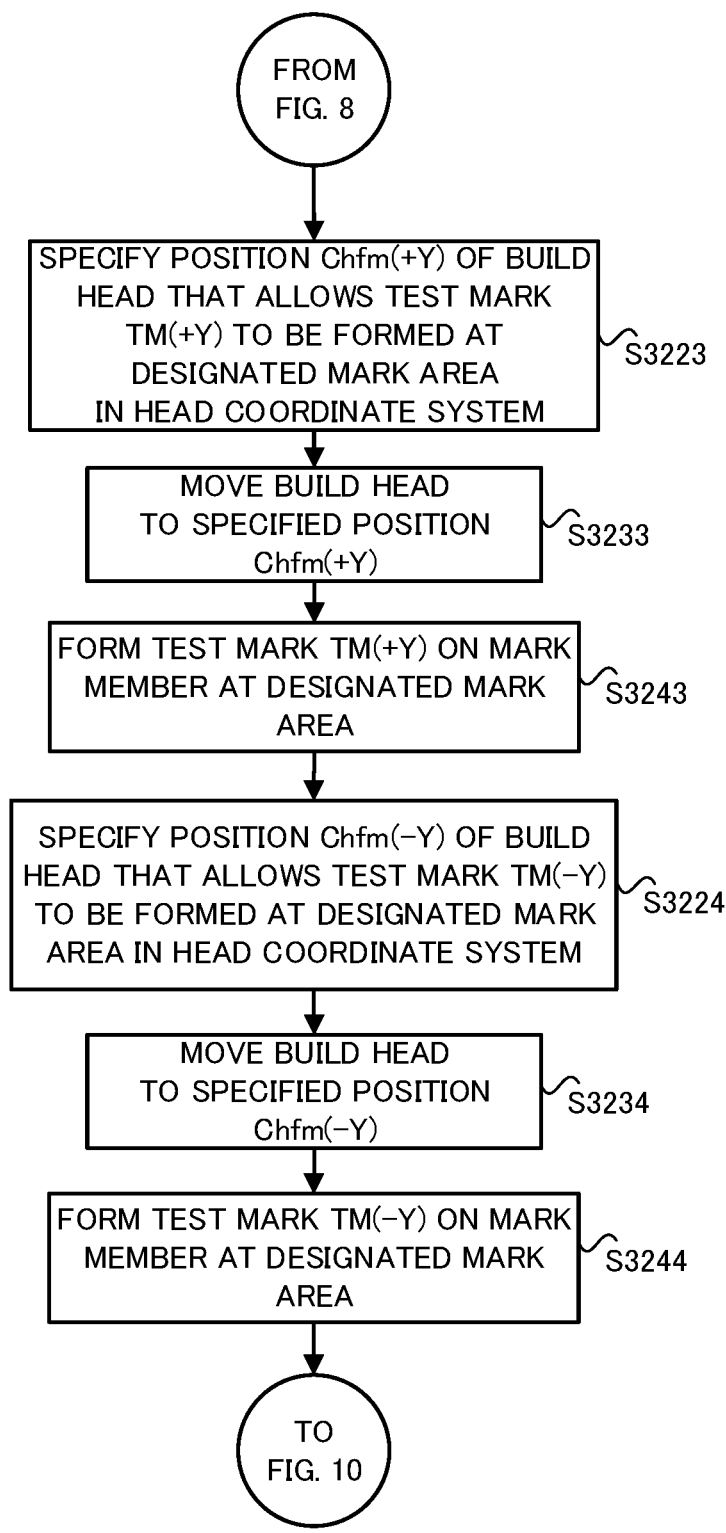
FIG. 9 is a flowchart that illustrates a flow of another part of the head moving operation in the first modified example.

Moreover, as illustrated in FIG. 9, before and after a process for forming at least one of the test mark TM(+X) and the test mark TM (-X), the control apparatus 15 specifies the position Chfm(+Y) of the build head 11 when the formation of the test mark TM(+Y) is started on the mark member FM disposed at the designated mark area 134*d* in the head coordinate system Ch (step S3223). The control apparatus 15 then controls the head driving system 12 to move the build head 11 to the position Chfm(+Y) specified in the step S3223 (step S3233). Then, after the build head 11 arrives at the position Chfm(+Y), the build system 1 forms the test mark TM (+Y) on the mark member FM disposed at the designated mark area 134d while moving the build head 11 along the Y axis of the head coordinate system Ch and toward the +Y side of the head coordinate system Ch, under the control of the control apparatus 15 (step S3243).

Moreover, as illustrated in FIG. 9, before and after a process for forming at least one of the test mark TM(+X), the test mark TM (−X) and the test mark TM(+Y), the control apparatus 15 specifies the position Chfm(−Y) of the build head 11 when the formation of the test mark TM(−Y) is started on the mark member FM disposed at the designated mark area 134d in the head coordinate system Ch (step S3224). The control apparatus 15 then controls the head driving system 12 to move the build head 11 to the position Chfm(−Y) specified in the step S3224 (step S3234). Then, after the build head 11 arrives at the position Chfm(−Y), the build system 1 forms the test mark TM(−Y) on the mark member FM disposed at the designated mark area 134d while moving the build head 11 along the Y axis of the head coordinate system Ch and toward the −Y side of the head coordinate system Ch, under the control of the control apparatus 15 (step S3244).

Figure 10:
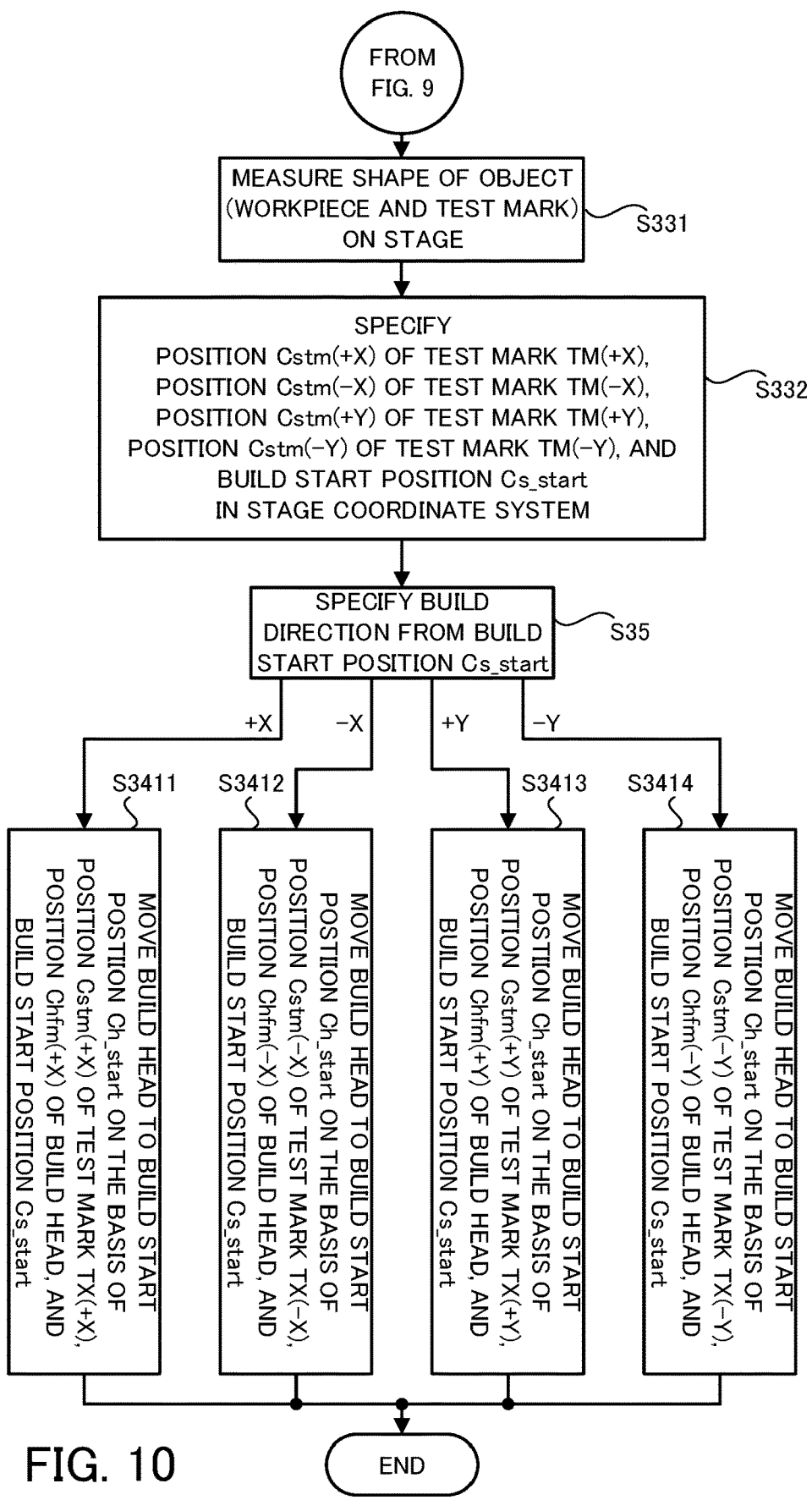
FIG. 10 is a flowchart that illustrates a flow of another part of the head moving operation in the first modified example.

Then, as illustrated in FIG. 10, the measurement apparatus 14 measures the state of the object on the stage 13 (specifically, the measurement target object including the four types of test marks TM and the workpiece W) (step S331). The measurement result of the measurement apparatus 14 (namely, an information relating to the state of the measurement target including the four types of test marks TM and the workpiece W) is output to the control apparatus 15.

After that, the control apparatus 15 specifies the positions Cstm of the four types of test marks TM formed, in the stage coordinate system Cs, on the basis of the measurement result of the measurement apparatus 14 (step S332). In particular, the control apparatus 15 specifies a position of an end of each test mark TM (especially, the end that corresponds to a firstly formed part of each test mark TM) as the position Cstm. Note that the control apparatus 15 may specify a position of the center of gravity or a position of center of each test mark TM as the position Cstm.

Specifically, as illustrated in FIG. 11, the test mark TM(+X) is formed by performing the additive processing for adding the build object from a −X side end to a +X side end of the test mark TM(+X). Thus, the control apparatus 15 specifies the position of the X side end of the test mark TM(+X) as the position Cstm(+X). In the same manner, the test mark TM(−X) is formed by performing the additive processing for adding the build object from a +X side end to a −X side end of the test mark TM(−X). Thus, the control apparatus 15 specifies the position of the +X side end of the test mark TM(−X) as the position Cstm (−X). In the same manner, the test mark TM(+Y) is formed by performing the additive processing for adding the build object from a −Y side to a +Y side end of the test mark TM(+Y). Thus, the control apparatus 15 specifies the position of the −Y side end of the test mark TM(+Y) as the position Cstm(+Y). In the same manner, the test mark TM(−Y) is formed by performing the additive processing for adding the build object from a +Y side end to a −Y side end of the test mark TM(−Y). Thus, the control apparatus 15 specifies the position of the +Y side end of the test mark TM(−Y) as the position Cstm (−Y).

Moreover, the control apparatus 15 specifies the build start position Cs_start at which the build should be started on the workpiece build surface MSW in the stage coordinate system Cs on the basis of the measurement result of the measurement apparatus 14 (the step S332). Note that a method for specifying the build start position Cs_start in the step S332 may be the same as the method for specifying the build start position Cs_start in the step S232 in FIG. 6 described above.

After that, the control apparatus 15 moves the build head 11 to the build start position Ch_start (step S3411 to step S3414). In the first modified example, in particular, the control apparatus 15 moves the build head 11 to the build start position Ch_start, on the basis of the position Cstm of the test mark TM formed by the build head 11 that moves in the same direction as the moving direction of the build head 11 when the build head 11 starts to move with the start of the additive processing on the workpiece W. For example, when the build head 11 starts to move along the X axis and toward the +X side with the start of the additive processing, the control apparatus 15 moves the build head 11 to the build start position Ch_start on the basis of the position Cstm(+X) of the test mark TM (+X). For example, when the build head 11 starts to move along the X axis and toward the −X side with the start of the additive processing, the control apparatus 15 moves the build head 11 to the build start position Ch_start on the basis of the position Cstm(−X) of the test mark TM(−X). For example, when the build head 11 starts to move along the X axis and toward the +Y side with the start of the additive processing, the control apparatus 15 moves the build head 11 to the build start position Ch_start on the basis of the position Cstm(+Y) of the test mark TM(+Y). For example, when the build head 11 starts to move along the X axis and toward the −Y side with the start of the additive processing, the control apparatus 15 moves the build head 11 to the build start position Ch_start on the basis of the position Cstm(−Y) of the test mark TM(−Y).

In order to move the build head 11 in this manner, the control apparatus 15 firstly determines in which direction the build head 11 starts to move with the start of additive processing (step S35). The control apparatus 15 determines which direction is the moving direction of the build head 11 when the build head 11 starts to move with the start of the additive processing (the step S35). The control apparatus 15 determines in which direction the build head 11 located at the build start position Ch_start starts to move with the start of the additive processing (the step S35). Specifically, the control apparatus 15 is allowed to specify the position of the workpiece W in the stage coordinate system Cs from the measurement result of the measurement apparatus 14. Moreover, the control apparatus 15 is allowed to specify how to form the three-dimensional structural object ST on the workpiece W on the basis of the three-dimensional model data of the three-dimensional structural object ST to be formed. When it is specified how to form the three-dimensional structural object ST on the workpiece W, it is possible to specify a moving trajectory of the build head 11 for forming the three-dimensional structural object ST (for example, a moving trajectory of the build head 11 for forming the first structure layer SL #1). When the moving trajectory of the build head 11 can be specified, it is also possible to specify the moving direction of the build head 11 when the additive processing is started on the workpiece W.

Figure 12:
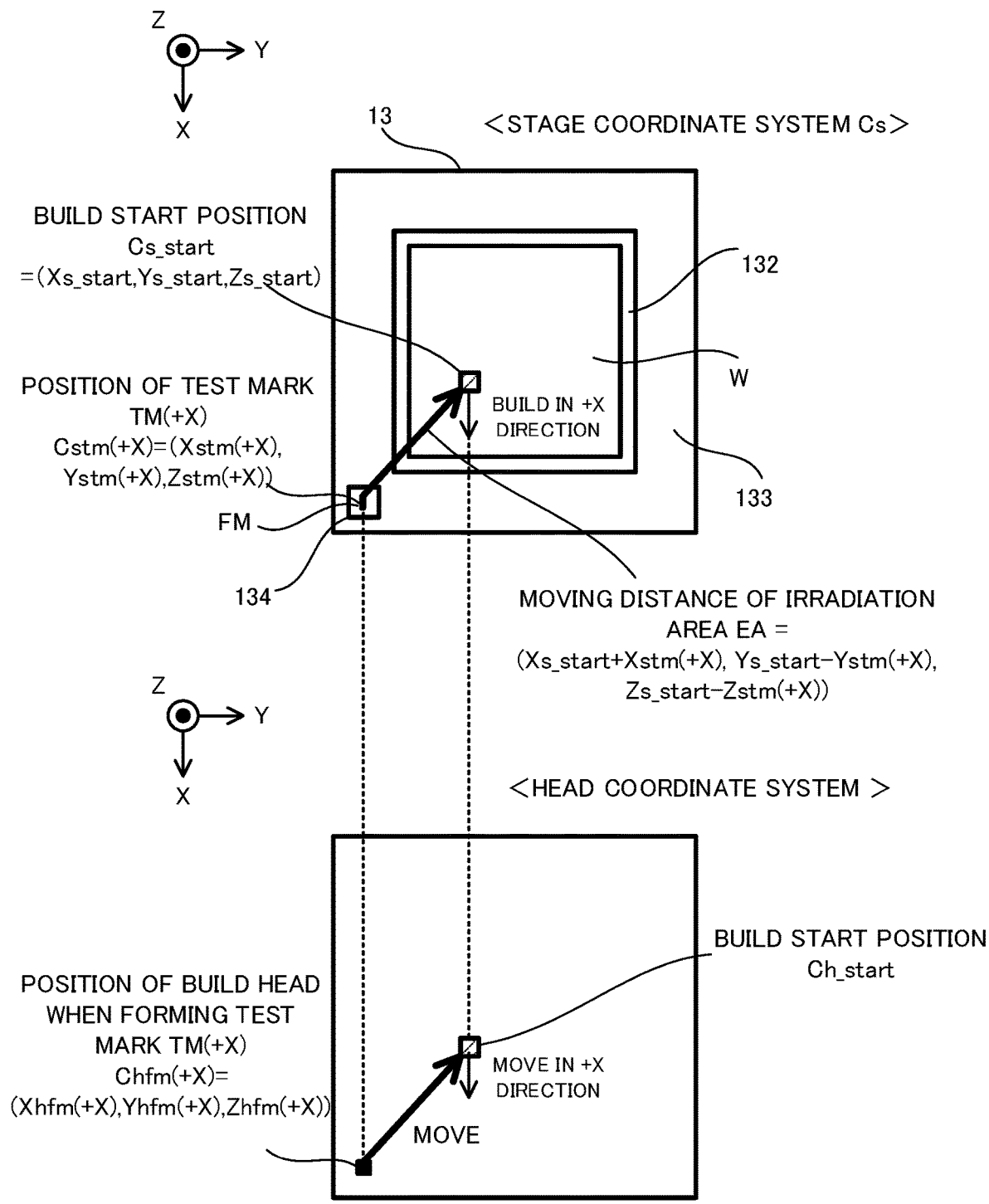
FIG. 12 is a plan view that illustrates a relationship between a position of a test mark and a build start position in the stage coordinate system, and a relationship between a position of a build head and the build start position in the head coordinate system.

In the step S35, when it is determined that the build head 11 starts to move along the X axis and toward the +X side, the control apparatus 15 moves the build head 11 to the build start position Ch_start on the basis of the position Cstm(+X) of the test mark TM(+X) specified in the step S332, the position Chfm(+X) of the build head 11 when the test mark TM(+X) is formed (namely, the position Chfm(+X) of the build head 11 specified in the step S3221) and the build start position Cs_start specified in the step S332 (step S3411). Note that an operation for moving the build head 11 to the build start position Ch_start on the basis of the position Cstm(+X) of the test mark TM(+X), the position Chfm(+X) of the build head 11 and the build start position Cs_start in the step S3411 may be the same as the operation for moving the build head 11 to the build start position Ch_start on the basis of the position Cstm of the test mark TM, the position Chfm of the build head 11 and the build start position Cs_start in the step S241 in FIG. 6 described above. Thus, a detailed description thereof will be omitted, but an outline thereof will be briefly described below. For example, as illustrated in FIG. 12, the control apparatus 15 specifies the moving distance and the moving direction of the irradiation area EA that moves from the position Cstm(+X)=(Xstm(+X), Ystm(+X), Zstm(+X)) of the test mark TM(+X) to the build start position Cs_start. The control apparatus 15 then uses the transformation matrix T to transform the moving distance and the moving direction of the irradiation area EA specified in the stage coordinate system Cs to the moving distance and the moving direction of the build head 11 in the head coordinate system Ch. Then, the control apparatus 15 moves the build head 11 located at the position Chfm(+X) in the head coordinate system Ch, in the moving direction obtained by the transformation, by the moving distance obtained by the transformation. As a result, the build head 11 is located at the build start position Ch_start.

In the step S35, when it is determined that the build head 11 starts to move along the X axis and toward the −X side, the control apparatus 15 moves the build head 11 to the build start position Ch_start on the basis of the position Cstm(−X) of the test mark TM(−X) specified in the step S332, the position Chfm(−X) of the build head 11 when the test mark TM(−X) is formed (namely, the position Chfm(−X) of the build head 11 specified in the step S3222) and the build start position Cs_start specified in the step S332 (step S3412). An operation for moving the build head 11 to the build start position Ch_start on the basis of the position Cstm(−X) of the test mark TM(−X), the position Chfm(−X) of the build head 11, and the build start position Cs_start in the step S3412 may be the same as the operation for moving the build head 11 to the build start position Ch_start on the basis of the position Cstm of the test mark TM, the position Chfm of the build head 11 and the build start position Cs_start in the step S241 in FIG. 6 described above. The same applies to a step S3413 and a step S3414 described later.

In the step S35, when it is determined that the build head 11 starts to move along the Y axis and toward the +Y side, the control apparatus 15 moves the build head 11 to the build start position Ch_start on the basis of the position Cstm(+Y) of the test mark TM(+Y) specified in the step S332, the position Chfm(+Y) of the build head 11 when the test mark TM(+Y) is formed (namely, the position Chfm(+Y) of the build head 11 specified in the step S3223) and the build start position Cs_start specified in the step S332 (step S3413).

In the step S35, when it is determined that the build head 11 starts to move along the Y axis and toward the −Y side, the control apparatus 15 moves the build head 11 to the build start position Ch_start on the basis of the position Cstm(−Y) of the test mark TM(−Y) specified in the step S332, the position Chfm(−Y) of the build head 11 when the test mark TM(−Y) is formed (namely, the position Chfm(−Y) of the build head 11 specified in the step S3224) and the build start position Cs_start specified in the step S332, (step S3414).

In this manner, even in the first modified example, as described above, the control apparatus 15 is allowed to appropriately move the build head 11 to the build start position Ch_start. That is, the control apparatus 15 is allowed to move the build head 11 so that the position of the build head 11 after the movement in the head coordinate system Ch is coincident with (or approaches) the build start position Ch_start. In other words, the control apparatus 15 is allowed to move the build head 11 so that the irradiation area EA that is irradiated with the light EL from the build head 11 after the movement is set at the build start position Cs_start.

In the first modified example, moreover, even when there is a possibility that the formation position of the build object on the workpiece W changes due to a difference in the moving direction of the build head 11, the build head 11 can be appropriately moved to the build start position Ch_start so as to form the build object at an appropriate position on the workpiece W. Specifically, in some characteristic of the head driving system 12, a relative positional relationship between the position of the build head 11 in the head coordinate system Ch and the position of the build object formed by the build head 11 in the stage coordinate system Cs may vary depending on the moving direction of the build head 11. For example, the relative positional relationship between the position of the build head 11 in the head coordinate system Ch and the position of the build object formed by the build head 11 in the stage coordinate system Cs when the build head 11 moves in the first direction may be different from the relative positional relationship between the position of the build head 11 in the head coordinate system Ch and the position of the build object formed by the build head 11 in the stage coordinate system Cs when the build head 11 moves in the second direction. The relative positional relationship with the position may be different. In this case, the position in the stage coordinate system Cs of the build object formed by the build head 11 that starts to move from a certain position in the head coordinate system Ch in the first direction (especially, the position in the stage coordinate system Cs of the end that corresponds to a build start part of the build object) may be no longer coincide with the position in the stage coordinate system Cs of the build object formed by the build head 11 that starts to move from the same position in the head coordinates system Ch in the second direction. As a result, the shape accuracy of the three-dimensional structural object ST that is an aggregation of shaped objects may deteriorate. In the first modified example, however, the control apparatus 15 moves the build head 11 to the build start position Ch_start on the basis of the positions of the plurality of test marks TM formed by the build head 11 that moves in respective different directions. Thus, even when the relative positional relationship between the position of the build head 11 in the head coordinate system Ch and the position of the build object formed by the build head 11 in the stage coordinate system Cs varies depending on the moving direction of the build head 11, the build head 11 is allowed to form an appropriate build object from the build start position Cs_start in the stage coordinate system Cs. Thus, the deterioration of the shape accuracy of the three-dimensional structural object ST is appropriately prevented.

Note that in the first modified example, there may be used the position Cstm of the test mark TM formed by the build head 11 that moves in a direction different from the moving direction of the build head 11 when the build head 11 starts to move with the start of the additive processing on the workpiece W. For example, when the build head 11 starts to move along a direction of 45 degrees with respect to the X axis and the Y axis and toward the +X side and the +Y side with the start of the additive processing, the control apparatus 15 may move the build head 11 to the build start position Ch_start on the basis of the position Cstm(+X) of the mark TM(+X) and the position Cstm(+Y) of the test mark TM(+Y). When the build head 11 starts to move along the direction of 45 degrees with respect to the X axis and the Y axis and toward the +X side and the +Y side with the start of the additive processing, an average value of the position Cstm(+X) of the test mark TM (+X) and the position Cstm(+Y) of the test mark TM(+Y) may be used, and when the direction is not 45 degrees, a weighted average of the position Cstm(+X) of the test mark TM(+X) and the position Cstm(+Y) of the test mark TM(+Y) may be used. In this manner, the statistics of the positions Cstm of the plurality of test marks TM may be used.

Note that in the above description, a plurality of types of test marks TM are formed on the same mark member 134 disposed at the designated mark area 134*d*. However, a part of the plurality of types of test marks TM may be formed on a first mark member FM-1 disposed at a first designated mark area 134*d*-1, and another part of the plurality of types of test marks TM may be formed on a second mark member FM-2 disposed at a second designated mark area 134*d*-2 that is different from the first designated mark area 134*d*-1.

Moreover, in the above description, the shape of each of the test marks TM(+X), TM(−X), TM(+Y) and TM(−Y) is linear, but the shape of the test mark may not be linear and may be curved or hook-shaped, for example.

(3-2) Second Modified Example

During a build period when the build operation is performed, the build surface MS that corresponds to the surface of the workpiece W (or the surface of the structural layer SL formed on the workpiece W) is irradiated with the light EL. Thus, there is a possibility that heat is transferred from the light EL to the workpiece W through the build surface CS (and moreover, through the structure layer SL). When the heat is transferred to the workpiece W, the workpiece W may be thermally expanded. On the other hand, when the build operation ends, the build surface MS is no longer irradiated with the light EL, and thus, the heat is no longer transferred from the light EL to the workpiece W. Therefore, the thermally workpiece W may be contracted.

Considering that the workpiece W may be thermally expanded and contracted in this manner, the build object (or the structure layer SL or the three-dimensional structural object ST) formed on the workpiece W in a state where the workpiece W is thermally expanded may be contracted with the contraction of the workpiece W. As a result, the shape accuracy of the three-dimensional structural object ST may deteriorate.

Thus, in a second modified example, the build system 1 controls the size of the build object that should be formed by the additive processing on the basis of the shape of the workpiece W during the build period. Specifically, the measurement apparatus 14 measures the shape of the workpiece W before the build operation is started. As a result, the control apparatus 15 is allowed to obtain a first shape information relating to an original shape (namely, a designed shape) of the workpiece W from the measurement apparatus 14. Alternatively, the control apparatus 15 may obtain the first shape information relating to the original shape of the workpiece W by obtaining a design data of the workpiece W. Moreover, the measurement apparatus 14 measures the shape of the workpiece W at a desired timing during the build period. As a result, the control apparatus 15 is allowed to obtain a second shape information relating to a current shape of the workpiece W from the measurement apparatus 14. Then, the control apparatus 15 determines whether or not an actual shape of the workpiece W is different from the original shape of the workpiece W on the basis of the obtained first and second shape information. As a result, when it is determined that the actual shape of the workpiece W is different from the original shape of the workpiece W, it is estimated that the workpiece W is deformed (typically, is thermally expanded) by the heat transmitted from the light EL.

Figure 13A:
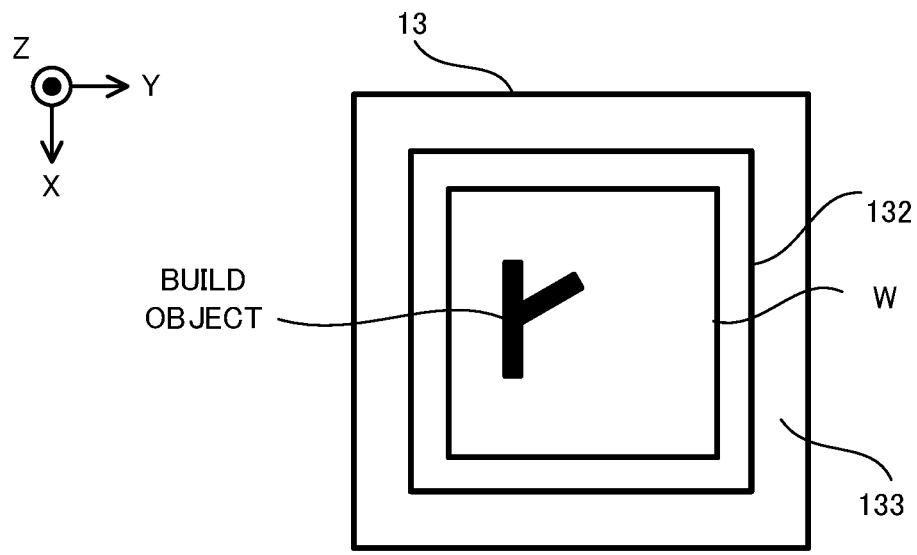
FIG. 13A is a plan view that illustrates a build object formed on a workpiece when the workpiece is not thermally expanded.
Figure 13B:
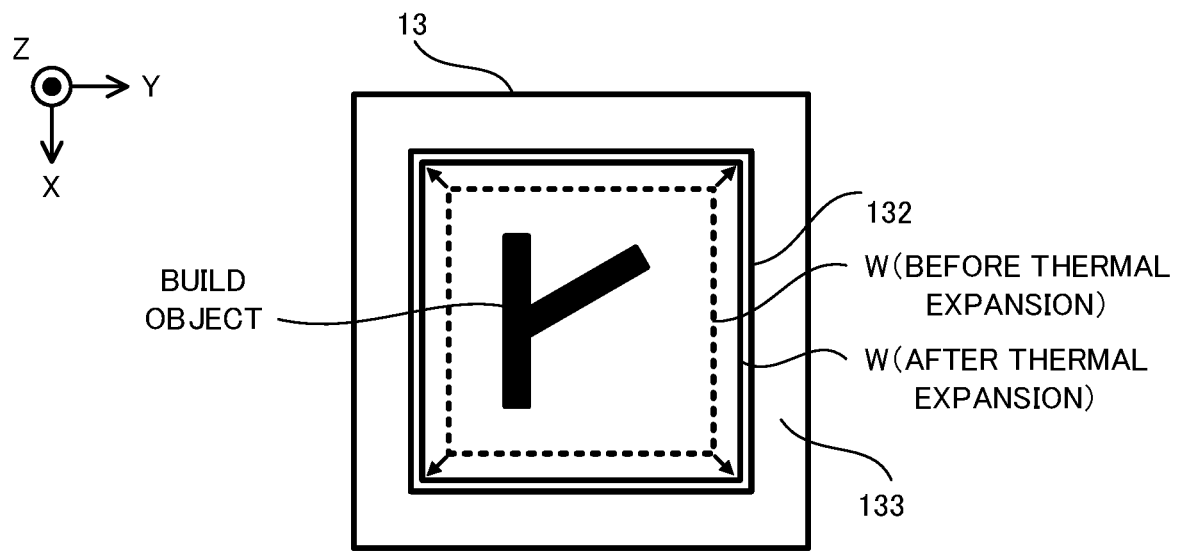
FIG. 13B is a plan view that illustrates a build object formed on a workpiece when the workpiece is thermally expanded.

When the workpiece W is thermally expanded, the control apparatus 15 forms the build object while controlling the size of the build object formed on the workpiece W, on the basis of an amount of deviation of the actual shape of the workpiece W from the original shape of the workpiece W. Here, the deviation of the actual shape of the workpiece W from the original shape of the workpiece W due to the thermal expansion of the workpiece W includes such a deviation related to scaling that the actual shape of the workpiece W is enlarged or reduced with respect to the original shape of the workpiece W. Specifically, for example, FIG. 13A is a plan view that illustrates the build object formed on the workpiece W when the workpiece W is not thermally expanded. On the other hand, FIG. 13B is a plan view that illustrates the build object formed on the workpiece W when the workpiece W is thermally expanded. As illustrated in FIG. 13A and FIG. 13B, the workpiece W that is thermally expanded has an enlarged shape with respect to the workpiece W that has the original shape (namely, that is not thermally expanded). In this case, when the workpiece W is thermally expanded, the control apparatus 15 may form the build object while controlling the size of the build object so that the size of the build object formed on the workpiece W also increases, compared to when the workpiece W is not thermally expanded. For example, the control apparatus 15 may specify a correlation information that defines a relationship between the original shape of the workpiece W and the actual shape of the workpiece W, and may control the size of the build object on the basis of the correlation information. An example of such correlation information may be a matrix (for example, a matrix related to scaling) that defines a relationship between coordinates indicating a certain position of the original workpiece W (for example, the workpiece W that is not thermally expanded) in the stage coordinate system Cs and coordinates indicating the same position of the actual workpiece W (for example, the workpiece W that is thermally expanded) in the stage coordinate system Cs.

The control apparatus 15 may control the size of the build object so as to reduce a difference between a ratio of the size of the build object to the size of the workpiece W when the workpiece W is thermally expanded and a ratio of the size of the build object to the size of the workpiece W when the workpiece W is not thermally expanded. In particular, the control apparatus 15 may control the size of the build object so that the ratio of the size of the build object to the size of the workpiece W when the workpiece W is thermally expanded is coincident with a ratio of the size of the build object to the size of the workpiece W when the workpiece W is not thermally expanded.

According to such a second modified example, even when the build object (or the structure layer SL or the three-dimensional structural object ST) formed on the workpiece W in the state where the workpiece W is thermally expanded is contracted with the contraction of the workpiece W, the size of the contracted build object does not deviate significantly from the size of the build object formed on the workpiece W that is not thermally expanded in the first place (and therefore is not contracted) (namely, the size of the build object that should be originally formed). In some cases, the size of the contracted build object may be coincident with the size of the build object formed on the workpiece W that is not thermally expanded in the first place (namely, the size of the build object that should be originally formed). Thus, the deterioration of the shape accuracy of the three-dimensional structural object ST is appropriately prevented.

Note that in the above description, the operation for measuring the current shape of the workpiece W and obtaining the second shape information relating to the current shape of the workpiece W is performed during the build period when the build operation is performed. However, the operation for measuring the current shape of the workpiece W and obtaining the second shape information relating to the current shape of the workpiece W may be performed before the build operation is started. This is because there is a possibility that the workpiece W is thermally expanded due to some factor even when the build operation is not started (namely, the build surface MS is not irradiated with the light EL).

The above description describes an example in which the deviation of the actual shape of the workpiece W from the original shape of the workpiece W is caused by the heat transmitted from the light EL. However, the deviation of the actual shape of the workpiece W from the original shape of the workpiece W may be caused due to another factor that is different from the heat transmitted from the light EL. Even in this case, the control apparatus 15 may form the build object while controlling the size of the build object formed on the workpiece W, on the basis of the amount of deviation of the actual shape of the workpiece W from the original shape of the workpiece W. As a result, the deterioration of the shape accuracy of the three-dimensional structural object ST is prevented.

In the above description, the deviation of the actual shape of the workpiece W from the original shape of the workpiece W due to the thermal expansion of the workpiece W includes such a deviation related to scaling that the actual shape of the workpiece W is enlarged or reduced with respect to the original shape of the workpiece W. However, the deviation of the actual shape of the workpiece W from the original shape of the workpiece W due to the thermal expansion of the workpiece W may include such a deviation related to parallel translation that the actual workpiece W moves in parallel to the original workpiece W (for example, moves in parallel along the XY plane). The deviation of the actual shape of the workpiece W from the original shape of the workpiece W due to the thermal expansion of the workpiece W may also include such a deviation related to rotation that the actual workpiece W rotates with respect to the original workpiece W (for example, rotates around the Z axis). Even in this case, the control apparatus 15 may form the build object while controlling the size (or any other characteristics such as the formation position) of the build object formed on the workpiece W so as to prevent the deterioration of the shape accuracy of the three-dimensional structural object ST (for example, to reduce a difference between the shape of the three-dimensional structural object ST formed in a situation in which the deviation occurs and the shape of the three-dimensional structural object ST formed in a situation in which the deviation does not occur, or to make the shapes coincident with each other), on the basis of the amount of deviation of the actual shape of the workpiece W from the original shape of the workpiece W.

(3-3) Third Modified Example

Next, a third modified example will be described. In the third modified example, a structure of a build system 1c in the third modified example is partially different from the structure of the build system 1 described above. Hereinafter, the structure of the build system 1c in the third modified example will be described with reference to FIG. 14. Note that the same structure as that of the build system 1 described above will carry the same reference number and a detailed description thereof will be omitted.

Figure 14:
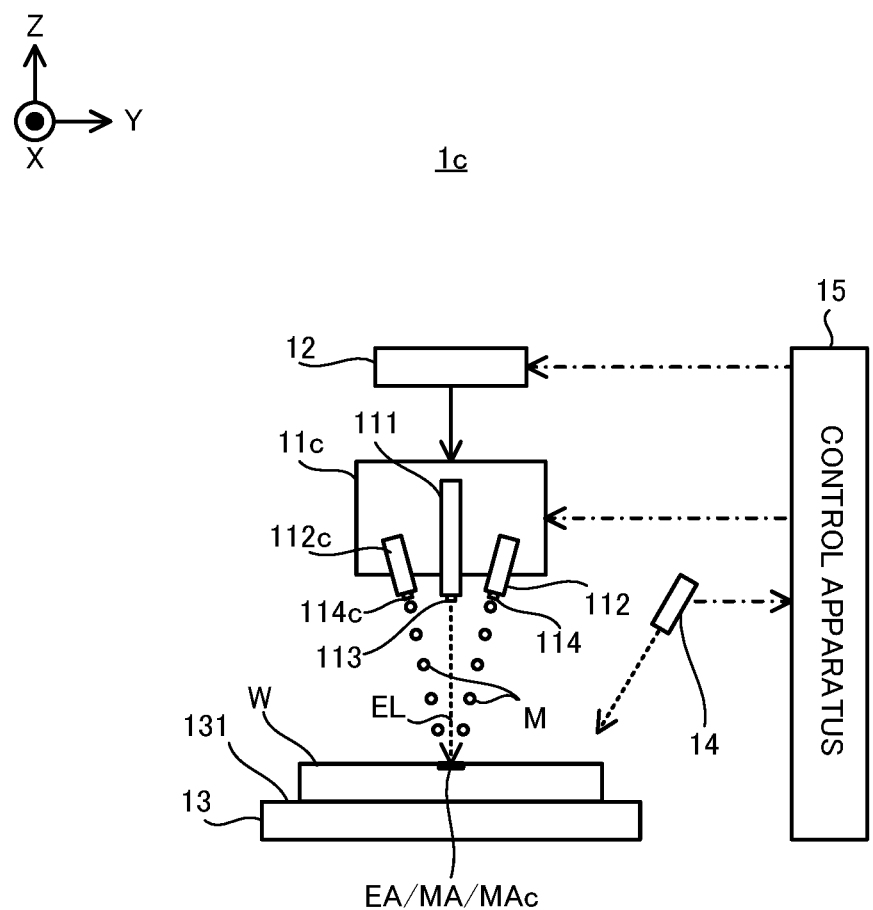
FIG. 14 is a cross-sectional view that illustrates a structure of a build system in a third modified example.

As illustrated in FIG. 14, the build system 1c is different from the above described build system 1 in that a build head 11c is provided instead of the build head 11. The build head 11c is different from the build head 11 described above in that a material nozzle 112c is further provided in addition to the irradiation system 111 and the material nozzle 112. The other structure of the build system 1c may be the same as the other structure of the build system 1.

The material nozzle 112c has a supply outlet (namely, a supply port) 114c for supplying the build materials M. The material nozzle 112c supplies (specifically, injects) the build materials M from the supply outlet 114c. The material nozzle 112c is physically connected to a not-illustrated material supply apparatus that is a supply source of the build materials M through a not-illustrated powdery material transporting member such as a pipe. The material nozzle 112c supplies the build materials M supplied from the material supply apparatus through the powdery material transporting member. Note that the material nozzle 112c is illustrated to have a tube shape in FIG. 14; however, the shape of the material nozzle 112c is not limited to this shape.

The material nozzle 112c supplies the build materials M downward (namely, toward the −Z side) from the material nozzle 112c. The stage 13 is disposed below the material nozzle 112c. When the workpiece W is loaded on the stage 13, the material nozzle 112c supplies the build materials M toward the workpiece W.

The material nozzle 112c is aligned to the irradiation system 111 so as to supply the build materials M to the irradiation area EA that is irradiated with the light EL. That is, the material nozzle 112c is aligned to the irradiation system 111 so that the irradiation area EA is coincident with (alternatively, at least partially overlaps with) a supply area MAc that is set on the workpiece W as an area to which the material nozzle 112c supplies the build materials M. In other words, the supply area MAc that is set on the workpiece W as the area to which the material nozzle 112c supplies the build materials M is coincident with (or at least partially overlaps with) the supply area MA that is set on the workpiece W as the area to which the material nozzle 112 supplies the build materials M. However, the supply area MAc that is set on the workpiece W as the area to which the material nozzle 112c supplies the build materials M may not overlap with the supply area MA that is set on the workpiece W as the area to which the material nozzle 112 supplies the build materials M.

Especially in the third modified example, a moving direction of the build materials M supplied from the material nozzle 112c is different from the moving direction of the build materials M supplied from the material nozzle 112. A supply direction of the build materials M from the material nozzle 112c is different from a supply direction of the build materials M from the material nozzle 112. That is, in the third modified example, the build system 1c is allowed to supply the build materials M to the workpiece W or the upper surface 131 of the stage 13 (especially, the mark area 134 or the mark member FM) from a plurality of different directions. In this case, for example, the build system 1c may perform the additive processing on the mark member FM while supplying the build materials M from the material nozzle 112 to form the first test mark TM on the mark member FM, and may perform the additive processing on the mark member FM while supplying the build materials M from the material nozzle 112c to form the second test mark that is different from the first test mark TM on the mark member FM. Note that the moving direction of the build materials M supplied from the material nozzle 112c is a direction that is inclined with respect to the Z axis by a predetermined angle (an acute angle as one example), but may be directly below (namely, a direction that is coincident with the Z axis).

Note that in the above description, the build system 1c is provided with a single build head 11c including the material nozzle 112c in addition to the irradiation system 111 and the material nozzle 112. The build system 1c, however, may be provided with a build head 11c-1 including the material nozzle 112c, separately from the build head 11 including the irradiation system 111 and the material nozzle 112. In this case, the head driving system 12 may move the build head 11c-1 separately from and independently of the build head 11.

(3-4) Fourth Modified Example

Next, a fourth modified example will be described. In the fourth modified example, a structure of a build system 1d in the fourth modified example is partially different from the structure of the build system 1 described above. Hereinafter, the structure of the build system 1d in the fourth modified example will be described with reference to FIG. 15. Note that the same structure as that of the build system 1 described above will carry the same reference number and a detailed description thereof will be omitted.

Figure 15:
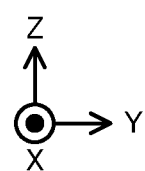
FIG. 15 is a cross-sectional view that illustrates a structure of a build system in a fourth modified example.
Figure 15:
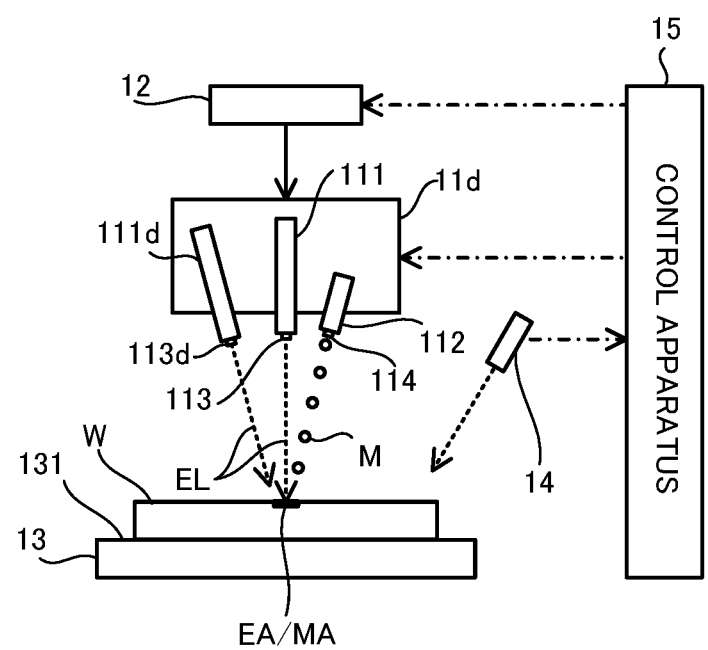

As illustrated in FIG. 15, the build system 1d is different from the above described build system 1 in that a build head 11d is provided instead of the build head 11. The build head 11d is different from the build head 11 described above in that an irradiation system 111d is further provided in addition to the irradiation system 111 and the material nozzle 112. The other structure of the build system 1d may be the same as the other structure of the build system 1.

The irradiation system 111d is an optical system (for example, a condensing optical system) for emitting the light EL from an emitting part 113d. Specifically, the irradiation system 111d is optically connected to a not-illustrated light source that generates the light EL through a not-illustrated light transmitting member such as an optical fiber. The irradiation system 111d emits the light EL propagated from the light source through the light transmission member. The irradiation system 111d emits the light EL downward (namely, toward the −Z side) from the irradiation system 111d. The stage 13 is disposed below the irradiation system 111d. When the workpiece W is loaded on the stage 13, the irradiation system 111d is allowed to emit the light EL toward the workpiece W. Specifically, the irradiation system 111d irradiates, with the light EL, an irradiation area EAd of a predetermined shape that is set on the workpiece W as an area that is irradiated with the light EL (typically, an area at which the light is condensed). Moreover, a state of the irradiation system 111d is switchable between a state where the light EL is emitted to the irradiation area EAd and a state where the light EL is not emitted to the irradiation area EAd, under the control of the control apparatus 15. Note that the irradiation area EAd that is irradiated with the light EL by the irradiation system 111d may be coincide with the irradiation area EA that is irradiated with the light EL by the irradiation system 111. The irradiation area EAd that is irradiated with the light EL by the irradiation system 111d may at least partially overlap with the irradiation area EA that is irradiated with the light EL by the irradiation system 111. The irradiation area EAd that is irradiated with the light EL by the irradiation system 111d may not overlap with the irradiation area EA that is irradiated with the light EL by the irradiation system 111.

Especially in the fourth modified example, a propagation direction of the light EL emitted from the irradiation system 111d is different from the propagation direction of the light EL emitted from the irradiation system 111. An irradiation direction of the light EL from the irradiation system 111d is different from an irradiation direction of the light EL from the irradiation system 111. That is, in the fourth modified example, the build system 1d is allowed to irradiate the workpiece W or the upper surface 131 of the stage 13 (especially, the mark area 134 or the mark member FM) with the light EL from a plurality of different directions. In this case, for example, the build system 1d may perform the additive processing on the mark member FM with the light EL emitted by the irradiation system 111 to form the first test mark TM on the mark member FM, and may perform the additive processing on the mark member FM with the light EL emitted by the irradiation system 111d to form the second test mark TM that is different from the first test mark TM on the mark member FM. Note that the moving direction of the build materials M supplied from the material nozzle 112c is directly below (namely, the direction that is coincident with the Z axis), but may be a direction that is inclined with respect to the Z axis by a predetermined angle (an acute angle as one example).

Note that in the above description, the build system 1d is provided with a single build head 11d including the irradiation system 111d in addition to the material nozzle 112 and the irradiation system 111d. The build system 1d, however, may be provided with a build head 11d-1 including the irradiation system 111d, separately from the build head 11 including the irradiation system 111 and the material nozzle 112. In this case, the head driving system 12 may move the build head 11d-1 separately from and independently of the build head 11.

Moreover, even in the fourth modified example, the build head 11d may be provided with the material nozzle 112c, as in the third modified example. In this case, the material nozzle 112 may supply the build materials M to the irradiation area EA that is irradiated with the light EL by the irradiation system 111, and the material nozzle 112c may supply the build materials M to the irradiation area EAd that is irradiated with the light EL by the irradiation system 111d. Alternatively, the build system 1d may be provided with a build head 11d-2 including the irradiation system 111d and the material nozzle 112c, separately from the build head 11 including the irradiation system 111 and the material nozzle 112.

(3-5) Other Modified Examples

In the above description, the mark member FM is disposed at the mark area 134. However, the mark member FM may not be disposed at the mark area 134. In this case, the build system 1 may form the test mark TM at the mark area 134 instead of the mark member FM.

In the above description, the build system 1 forms the test mark TM on the mark member FM disposed at the mark area 134. The build system 1, however, may form the test mark TM on the mark member FM disposed at an area that is different from the mark area 134. For example, the build system 1 may form the test mark TM on the mark member FM disposed at any position in the non-holding area 133 of the stage 13. The build system 1 may form the test mark TM on the mark member FM disposed at any position in the holding area 132 of the stage 13. The build system 1 may form the test mark TM on the mark member FM disposed at any position on the workpiece W held by the stage 13.

In the above description, the build system 1 forms the test mark TM on the mark member FM. The build system 1, however, may form the test mark TM on a member that is different from the mark member FM. For example, the build system 1 may form the test mark TM at any position in the non-holding area 133 of the stage 13. For example, the build system 1 may form the test mark TM at any position in the holding area 132 of the stage 13. The build system 1 may form the test mark TM at any position on the workpiece W held by the stage 13. When the test mark TM is formed on the workpiece W held by the stage 13, a position at which the test mark TM is formed may be different from an area at which the build object is formed.

In the above description, in the initial setting operation, the plurality of mark members FM are respectively disposed at the plurality of mark areas 134. However, the mark members FM may be disposed at a part of the plurality of mark areas 134 and the mark members FM may not be disposed at a remaining part of the plurality of mark areas 134. For example, while the mark members FM may be disposed at the mark areas 134 the number of which is necessary for calculating the transformation matrix T among the plurality of mark areas 134 and the mark members FM may not be disposed at the rest of the plurality of mark areas 134. In the example described above, in order to calculate the transformation matrix T, the test mark TM is formed on each of at least three mark members FM respectively disposed at at least three mark areas 134. In this case, when four or more mark areas 134 are set on the stage 13, for example, at least three mark members FM may be disposed at three mark areas 134 and the mark member FM may not be disposed at the remaining one or more mark areas 134.

In the above description, the build system 1 performs the alignment operation before starting the build operation for performing the additive processing on the workpiece W. The build system 1, however, may perform the alignment operation at another timing. For example, the build system 1 may perform the alignment operation (especially, the initial setting operation) in preparation for the next build operation after completing the build operation (namely, after forming the three-dimensional structure ST). For example, the build system 1 may perform the alignment operation after temporarily suspending the build operation in the middle of the build operation. In this case, the build system 1 restarts the suspended build operation after the alignment operation is completed. As an example, for example, the build system 1 may temporarily suspend the build operation before forming the next structural layer SL and then perform the alignment operation at each time when a certain structural layer SL is formed.

In the above description, the head moving operation is an operation for moving the build head 11 to the build start position Ch_start. The head moving operation, however, may include an operation for moving the build head 11 to any position Ch_any in the head coordinate system Ch. The control apparatus 15 may move the build head 11 to any position Ch_any in the head coordinate system Ch by performing an operation that is same as the operation of moving the build head 11 to the build start position Ch_start. That is, the control apparatus 15 specifies any position Cs_any in the stage coordinate system Cs instead of the above described build start position Cs_start, and may move the build head 11 to the position Ch_any corresponding to the position Cs_any in the head coordinate system Ch on the basis of the position Cstm of the test mark, the position Chfm of the build head 11 and the position Cs_any.

In the above description, the build system 1 is provided with the head driving system 12 that moves the build head 11. The build system 1, however, may be provided with a stage driving system that moves the stage 13 in addition to or instead of the head driving system 12. The stage driving system may move the stage 13 in at least one of the X axis direction, the Y axis direction, the Z axis direction, the OX direction, the OY direction, and the OZ direction. By the movement of the stage 13 by the stage driving system, the relative positional relationship between the stage 13 and the build head 11 (namely, the relative positional relationship between the workpiece W and the irradiation area EA) is changed, as with the movement of the build head 11 by the head driving system 12.

In the above description, the build system 1 moves the build head 11, thereby to move the irradiation area EA relative to the build surface MS. The build system 1, however, may move the irradiation area EA relative to the build surface MS by deflecting the light EL, in addition to or instead of moving the build head 11. In this case, the irradiation system 111 may be provided with, for example, an optical system that is allowed to deflect the light EL (for example, a Galvanometer mirror, etc.).

In the above description, the alignment operation is an operation for moving the build head 11 relative to the workpiece W (namely, relative to the stage 13) so as to align the workpiece W and the build head 11. Here, the purpose of aligning the workpiece W and the build head 11 is to set the irradiation area EA at a desired position of the workpiece W (for example, the build start position Cs_start) by changing the position of the irradiation area EA by the movement of the build head 11. Thus, the alignment operation is substantially equivalent to an operation for moving the irradiation area EA relative to the workpiece W (namely, relative to the stage 13) in order to align the workpiece W and the irradiation area EA. In this case, the build system 1 may move the stage 13 by using the above described stage driving system in addition to or instead of moving the build head 11 by using the head driving system 12 in order to perform the alignment operation, thereby to move the irradiation area EA relative to the workpiece W (namely, relative to the stage 13). For example, the build system 1 may move the stage 13 in the stage coordinate system Cs so that the irradiation area EA is set at a desired position in the stage coordinate system Cs while the position of the build head 11 is fixed or in accordance with the movement of the build head 11. Alternatively, the build system 1 may move the irradiation area EA by using the above described optical system that is allowed to deflect the light EL (for example, the Galvanometer mirror, etc.) in addition to or instead of moving at least one of the build head 11 and the stage 13 in order to perform the alignment operation, thereby to move the irradiation area EA relative to the workpiece W (namely, relative to the stage 13). For example, the build system 1 may move the irradiation area EA in the head coordinate system Ch so that the irradiation area EA is set at a desired position in the stage coordinate system Cs (refer to FIG. 7) while the position of the build head 11 is fixed or in accordance with the movement of the build head 11. In any case, the implementation of the above described alignment operation allows the irradiation area EA to be set at the desired position of the workpiece W (for example, the build start position Cs_start).

In the above described description, the build system 1 melts the build materials M by irradiating the build materials M with the light EL. However, the build system 1 may melt the build materials M by irradiating the build materials M with any energy beam. In this case, the build system 1 may be provided with a beam irradiation apparatus that is configured to emit any energy beam in addition to or instead of the irradiation system 111. Any energy beam includes, but is not limited to, a charged particle beam such as an electron beam and an ion beam or an electromagnetic wave.

In the above described description, the build system 1 is configured to form the three-dimensional structural object ST by the Laser Metal Deposition. However, the build system 1 may form the three-dimensional structural object ST from the build materials M by another method by which the three-dimensional structural object ST is formed. A Powder Bed Fusion such as a Selective Laser Sintering (SLS), a Binder Jetting or a Laser Metal Fusion (LMF) is one example of another method, for example.

In the above described description, the build system 1 forms the three-dimensional structural object ST by supplying the build materials M from the material nozzle 112 to the irradiation area EA that is irradiated with the light EL by the irradiation system 111. However, the build system 1 may form the three-dimensional structural object ST by supplying the build materials M from the material nozzle 112 without emitting the light EL from the irradiation system 111. For example, the build system 1 may form the three-dimensional structural object ST by blowing the build materials M from the material nozzle 112 to the build surface MS to melt the build materials M at the build surface MS and solidifying the molten build materials M. For example, the build system 1 may form the three-dimensional structural object ST by blowing a gas containing the build materials M at the ultra-high speed from the material nozzle 112 to the build surface MS to melt the build materials M at the build surface MS and solidifying the molten build materials M. For example, the build system 1 may form the three-dimensional structural object ST by blowing the heated build materials M from the material nozzle 112 to the build surface MS to melt the build materials M at the build surface MS and solidifying the molten build materials M. When the three-dimensional structural object ST is formed without emitting the light EL from the irradiation system 111 as described above, the build system 1 (especially, the build head 11) may not be provided with the irradiation system 111.

In the above described description, the build system 1 is configured to perform the additive processing. However, the build system 1 may also perform a removal processing. At this time, the test mark TM may be formed by the removal processing.

At least a part of the features of each embodiment described above may be appropriately combined with at least another part of the features of each embodiment described above. A part of the features of each embodiment described above may not be used. Moreover, the disclosures of all publications and United States patents that are cited in each embodiment described above are incorporated in the disclosures of the present application by reference if it is legally permitted.

The present invention is not limited to the above described examples and is allowed to be changed, if desired, without departing from the essence or spirit of the invention which can be read from the claims and the entire specification. A processing system and a processing method, which involve such changes, are also intended to be within the technical scope of the present invention.

DESCRIPTION OF REFERENCE CODES 1 build system
11 build head
111 irradiation system
112 material nozzle
13 stage
131 upper surface
132 holding area
133 non-holding area
134 mark area
14 measurement apparatus
W workpiece
M build material
LS structural layer
ST three-dimensional structural object
FM mark member
TM test mark

The invention claimed is:

1. A processing system comprising:
a support apparatus that is configured to support a processing target;
a processing apparatus that performs a processing by irradiating a processed area on the processing target with an energy beam;
a position change apparatus that changes a relative positional relationship between the support apparatus and an irradiation area of the energy beam; and
a control apparatus comprising a processor programmed to control the position change apparatus based on position information of a reference, which is a three-dimensional structural object on at least one of the support apparatus and the processing target and which has been formed by previously performing the processing on the at least one support apparatus and processing target by the processing apparatus,
wherein the position information has been obtained by the control apparatus after the formation of the reference.

2. The processing system according to claim 1, wherein the processing system further comprises a measurement apparatus that is configured to measure a relative positional relationship between the processing target and the reference.

3. The processing system according to claim 1, wherein the processing system further comprises a measurement apparatus that is configured to measure a relative positional relationship between a part of the processing target and the reference that is formed at a different position from the part.

4. The processing system according to claim 1, wherein the control apparatus controls the processing apparatus to form a first reference extending in a first direction and a second reference extending in a second direction that intersects with the first direction, in at least one of the support apparatus and the processing target.

5. The processing system according to claim 1, wherein the control apparatus calculates a positional relationship between the irradiation area and the reference and controls the position change apparatus by using a calculation result.

6. A processing system comprising:
a support apparatus that is configured to support a processing target;
a processing apparatus that performs an additive processing by irradiating a processed area on the processing target with an energy beam and by supplying materials to an area that is irradiated with the energy beam;
a position change apparatus that changes a positional relationship between the support apparatus and an irradiation area of the energy beam from the processing apparatus; and
a processor programmed to control the processing system to perform the additive processing on at least one of a first area that is a part of the support apparatus and a second area that is a part of the processing target so as to form a three-dimensional fiducial build object on the at least one of the first and second areas,
wherein the processor controls at least one of the processing apparatus and the position change apparatus by using information relating to the formed fiducial build object, the information having been obtained by the processing system after the formation of the fiducial build object.

7. The processing system according to claim 6, wherein the processor controls the position change apparatus so that the additive processing is performed on a desired part of the processing target by using the information relating to the fiducial build object.

8. The processing system according to claim 6, wherein the processor controls the position change apparatus so that the additive processing is started from a desired part of the processing target by using the information relating to the fiducial build object.

9. The processing system according to claim 6, wherein the processor controls the processing apparatus and the position change apparatus to form the fiducial build object by performing the additive processing on at least one of the first area and the second area before the processing apparatus starts the additive processing on the processing target,
the processor controls the position change apparatus by using the information relating to the fiducial build object after forming the fiducial build object, and
the processor controls the processing apparatus to start the additive processing on the processing target after controlling the position change apparatus by using the information relating to the fiducial build object.

10. The processing system according to claim 6, wherein the processor controls the processing apparatus and the position change apparatus to form the fiducial build object by performing the additive processing on at least one of the first area and the second area before the processing apparatus starts the additive processing on the processing target,
the processor controls the position change apparatus by using the information relating to the fiducial build object so that the irradiation area is set in a processing start part of the processing target in which the additive processing should be started, after forming the fiducial build object, and the processor controls the processing apparatus to start the additive processing on the processing target after the irradiation area is set in the processing start part.

11. The processing system according to claim 6, wherein the processor controls the position change apparatus so that the irradiation area moves relative to the support apparatus in a moving direction that is calculated based on the information relating to the fiducial build object, from a base point that is a position of the irradiation area relative to the support apparatus when the fiducial build object is formed in at least one of the first area and the second area.

12. The processing system according to claim 6, wherein the processor controls the position change apparatus so that a position of the irradiation area relative to the support apparatus is changed by a moving distance that is calculated based on the information relating to the fiducial build object, from a base point that is a position of the irradiation area relative to the support apparatus when the fiducial build object is formed in at least one of the first area and the second area.

13. The processing system according to claim 6, wherein the position change apparatus changes the positional relationship between the support apparatus and the irradiation area by moving the processing apparatus relative to the support apparatus.

14. The processing system according to claim 13, wherein the processor controls the processing apparatus and the position change apparatus to form the fiducial build object by performing the additive processing on at least one of the first area and the second area before the processing apparatus starts the additive processing on the processing target,
the processor controls the position change apparatus by using the information relating to the fiducial build object so that the processing apparatus is located at a processing start position at which the processing apparatus performs the additive processing in a processing start part of the processing target in which the additive processing should be started, after forming the fiducial build object, and
the processor controls the processing apparatus to start the additive processing on the processing target after the processing apparatus is located at the processing start position.

15. The processing system according to claim 13, wherein the processor controls the position change apparatus so that the processing apparatus moves relative to the support apparatus in a moving direction that is calculated based on the information relating to the fiducial build object, from a base point that is a position of the processing apparatus relative to the support apparatus when the fiducial build object is formed in at least one of the first area and the second area.

16. The processing system according to claim 13, wherein the processor controls the position change apparatus so that a position of the processing apparatus relative to the support apparatus is changed by a moving distance that is calculated based on the information relating to the fiducial build object, from a base point that is a position of the processing apparatus relative to the support apparatus when the fiducial build object is formed in at least one of the first area and the second area.

17. The processing system according to claim 6, wherein the information relating to the fiducial build object includes an information relating to a state of the fiducial build object.

18. The processing system according to claim 6, wherein the information relating to the fiducial build object includes a first position information relating to a relative positional relationship between the processing target and the fiducial build object.

19. The processing system according to claim 18, wherein the first position information includes an information relating to a relative positional relationship between a processing start part of the processing target in which the additive processing should be started and the fiducial build object.

20. The processing system according to claim 18, wherein the first position information includes an information relating to at least one of a relative position between the processing target and the fiducial build object along a first direction, a relative position between the processing target and the fiducial build object along a second direction that intersects with the first direction, and a relative position between the processing target and the fiducial build object along a third direction that intersects with the first and second directions.

21. The processing system according to claim 6, wherein the processor controls the position change apparatus, by using a second position information relating to a relative positional relationship between the support apparatus and the processing apparatus when the fiducial build object is formed in at least one of the first area and the second area, in addition to the information relating to the fiducial build object.

22. The processing system according to claim 6, wherein the processor controls the processing apparatus and the position change apparatus to form a first build object as the fiducial build object by performing the additive processing on the first area while changing a positional relationship between the support apparatus and the processing apparatus along a fourth direction.

23. The processing system according to claim 22, wherein the information relating to the fiducial build object includes a first information relating to the first build object.

24. The processing system according to claim 23, wherein the processor controls the position change apparatus by using the first information, when the processing apparatus starts the additive processing to perform the additive processing on the processing target while moving relative to the support apparatus along the fourth direction.

25. The processing system according to claim 23, wherein the processor controls the position change apparatus by using the first information so that the processing apparatus is located at a processing start position at which the processing apparatus performs the additive processing in a processing start part of the processing target in which the additive processing should be started, and the processor controls the processing apparatus to start, on the processing target, the additive processing that is performed while the processing apparatus moves relative to the support apparatus along the fourth direction.

26. The processing system according to claim 22, wherein the processor controls the processing apparatus and the position change apparatus to form a second build object as the fiducial build object by performing the additive processing on at least one of the first area and the second area while the processing apparatus moves relative to the support apparatus along a fifth direction that is different from the fourth direction.

27. The processing system according to claim 26, wherein the information relating to the fiducial build object includes a second information relating to the second build object.

28. The processing system according to claim 27, wherein the processor controls the position change apparatus by using the second information, when the processing apparatus starts the additive processing to perform the additive processing on the processing target while moving relative to the support apparatus along the fifth direction.

29. The processing system according to claim 27, wherein the processor controls the position change apparatus by using the second information so that the processing apparatus is located at a processing start position at which the processing apparatus performs the additive processing in a processing start part of the processing target in which the additive processing should be started, and the processor controls the processing apparatus to start, on the processing target, the additive processing that is performed while the processing apparatus moves relative to the support apparatus along the fifth direction.

30. The processing system according to claim 26, wherein the fifth direction is opposite to the fourth direction.

31. The processing system according to claim 22, wherein the processor controls the processing apparatus and the position change apparatus to form a third build object as the fiducial build object by performing the additive processing on at least one of the first area and the second area while the processing apparatus moves relative to the support apparatus along a sixth direction that is different from the fourth direction.

32. The processing system according to claim 31, wherein the information relating to the fiducial build object includes a third information relating to the third build object.

33. The processing system according to claim 32, wherein the processor controls the position change apparatus by using the third information, when the processing apparatus starts the additive processing to perform the additive processing on the processing target while moving relative to the support apparatus along the sixth direction.

34. The processing apparatus according to claim 32, wherein
the processor controls the position change apparatus by using the third information so that the processing apparatus is located at a processing start position at which the processing apparatus performs the additive processing in a processing start part of the processing target in which the additive processing should be started, and the processor controls the processing apparatus to start, on the processing target, the additive processing that is performed while the processing apparatus moves relative to the support apparatus along the sixth direction, for the processing target.

35. The processing system according to claim 32, wherein the sixth direction intersects with the fourth direction.

36. The processing system according to claim 32, wherein the processor controls the processing apparatus and the position change apparatus to form a fourth build object as the fiducial build object by performing the additive processing on at least one of the first area and the second area while the processing apparatus moves relative to the support apparatus along a seventh direction that is different from the fourth direction and the sixth direction.

37. The processing system according to claim 36, wherein the information relating to the fiducial build object includes a fourth information relating to the fourth build object.

38. The processing system according to claim 37, wherein the processor controls the position change apparatus by using the fourth information, when the processing apparatus starts the additive processing to perform the additive processing on the processing target while moving relative to the support apparatus along the seventh direction.

39. The processing system according to claim 37, wherein the processor controls the position change apparatus by using the fourth information so that the processing apparatus is located at a processing start position at which the processing apparatus performs the additive processing in a processing start part of the processing target in which the additive processing should be started, and the processor controls the processing apparatus to start, on the processing target, the additive processing that is performed while moving relative to the support apparatus along the seventh direction.

40. The processing system according to claim 37, wherein the seventh direction intersects with the fourth direction and is opposite to the sixth direction.

41. The processing system according to claim 6, wherein the information relating to the fiducial build object is measured by a measurement apparatus.

42. The processing system according to claim 41, wherein the processing system further comprises the measurement apparatus.

43. The processing system according to claim 41, wherein the measurement apparatus is configured to measure a relative positional relationship between the processing target and the fiducial build object.

44. The processing system according to claim 43, wherein the processor controls the processing apparatus and the position change apparatus to form a fifth build object as the fiducial build object by performing the additive processing on a first part of at least one of the first area and the second area, to form a sixth build object as the fiducial build object by performing the additive processing on a second part, which is different from the first part, of at least one of the first area and the second area, and to form a seventh build object as the fiducial build object by performing the additive processing on a third part, which is different from the first and second parts, of at least one of the first area and the second area,
the information relating to the fiducial build object includes a fifth information relating to the fifth build object to the seventh build object, and
the processor associates a first coordinate system for representing a position of the processing apparatus with a second coordinate system for representing the relative positional relationship between the processing target and the fiducial build object that is measured by the measurement apparatus.

45. The processing system according to claim 44, wherein a height of at least one of the first part to the third part is different from a height of at least another one of the first part to the third part.

46. The processing system according to claim 44, wherein a support area of the support apparatus that is allowed to support the processing object is disposed between at least two of the first part to the third part.

47. The processing system according to claim 6, wherein the processor controls at least one of the processing apparatus and the position change apparatus based on a deviation information relating to a deviation between an actual shape of the processing target and a designed shape of the processing target.

48. The processing system according to claim 47, wherein the processor controls at least one of the processing apparatus and the position change apparatus based on the deviation information so that an additional build object of a desired shape is added in a desired part of the processing target by the additive processing.

49. The processing system according to claim 48, wherein the processor controls at least one of the processing apparatus and the position change apparatus based on the deviation information so that a shape of the additional build object becomes larger as the actual shape of the processing target is larger with respect to the designed shape of the processing target.

50. The processing system according to claim 6, wherein the information relating to the fiducial build object includes a size information relating to a size of the fiducial build object.

51. The processing system according to claim 6, wherein the information relating to the fiducial build object includes a shape information relating to a shape of the fiducial build object.

52. The processing system according to claim 6, wherein the processor is programmed to control the processing system to form an eighth build object as the fiducial build object by performing the additive processing on at least one of the first area and the second area while supplying the materials from an eighth direction to the area that is irradiated with the energy beam, and
the processor is programmed to control the processing system to form a ninth build object as the fiducial build object by performing the additive processing on at least one of the first area and the second area while supplying the materials from a ninth direction, which is different from the eighth direction, to the area that is irradiated with the energy beam.

53. The processing system according to claim 6, wherein the processing apparatus includes a first supply port for supplying the materials and a second supply port for supplying the materials,
the processor is programmed to control the processing system to form an eighth build object as the fiducial build object by performing the additive processing on at least one of the first area and the second area while supplying the materials from the first supply port to the area that is irradiated with the energy beam, and
the processor is programmed to control the processing system to form a ninth build object as the fiducial build object by performing the additive processing on at least one of the first area and the second area while supplying the materials from the second supply port to the area that is irradiated with the energy beam.

54. The processing system according to claim 6, wherein the processor is programmed to control the processing system to form a tenth build object as the fiducial build object by performing the additive processing on at least one of the first area and the second area while irradiating the processing target with the energy beam from a tenth direction, and the processor is programmed to control the processing system to form an eleventh build object as the fiducial build object by performing the additive processing on at least one of the first area and the second area while irradiating the processing target with the energy beam from an eleventh direction that is different from the tenth direction.

55. A method for a processing system comprising (i) a support apparatus that is configured to support a processing target, (ii) a processing apparatus that performs an additive processing by irradiating a processed area on the processing target with an energy beam and by supplying materials to an area that is irradiated with the energy beam, and (iii) a position change apparatus that changes a positional relationship between the support apparatus and an irradiation area of the energy beam from the processing apparatus, the method comprising:

controlling the processing system to perform the additive processing on at least one of a first area that is a part of the support apparatus and a second area that is a part of the processing target so as to form a three-dimensional fiducial build object on the at least one of the first and second areas; and then controlling at least one of the processing apparatus and the position change apparatus by using information relating to the formed fiducial build object, the information having been obtained by the processing system after the formation of the fiducial build object.

56. A non-transitory computer-readable medium comprising computer program instructions that, when executed by a processing system comprising (i) a support apparatus that is configured to support a processing target, (ii) a processing apparatus that performs an additive processing by irradiating a processed area on the processing target with an energy beam and by supplying materials to an area that is irradiated with the energy beam, and (iii) a position change apparatus that changes a positional relationship between the support apparatus and an irradiation area of the energy beam from the processing apparatus, cause the processing system to:

perform the additive processing on at least one of a first area that is a part of the support apparatus and a second area that is a part of the processing target so as to form a three-dimensional fiducial build object on the at least one of the first and second areas; and then control at least one of the processing apparatus and the position change apparatus by using information relating to the fiducial build object, the information having been obtained by the processing system after the formation of the fiducial build object.

* * * * *